US012728789B2

(12) United States Patent
Kent et al.

(10) Patent No.: US 12,728,789 B2
(45) Date of Patent: Sep. 8, 2026

(54) OFF-ROAD VEHICLE HEADLAMP AIMING AND ADJUSTMENT

(71) Applicant: Polaris Industries Inc., Medina, MN (US)

(72) Inventors: Tyler Kent, Andover, MN (US); David Andrew Reed, Baudette, MN (US); Kristina Lynn Zmuda, Athens, AL (US)

(73) Assignee: POLARIS INDUSTRIES INC., Medina, MN (US)

( * ) Notice: Subject to any disclaimer, the term of this patent is extended or adjusted under 35 U.S.C. 154(b) by 249 days.

(21) Appl. No.: 18/398,284

(22) Filed: Dec. 28, 2023

(65) Prior Publication Data

US 2024/0217425 A1 Jul. 4, 2024

Related U.S. Application Data

(60) Provisional application No. 63/436,147, filed on Dec. 30, 2022.

(51) Int. Cl.
*B60Q 1/04* (2006.01)

(52) U.S. Cl.
CPC .......... *B60Q 1/045* (2013.01); *B60Q 2200/30* (2013.01)

(58) Field of Classification Search
CPC .. B60Q 1/0683; B60Q 1/045; B60Q 2200/30; B60Q 1/0686; B60Q 1/04; B60Q 2200/38; B60Q 1/0408; B60Q 1/0047; B60Q 1/0466; B60Q 1/0475; B60Q 2300/00; B60Q 2200/00; F21S 41/00; F21S 45/33
See application file for complete search history.

(56) References Cited

U.S. PATENT DOCUMENTS 11,628,761 B1 * 4/2023 Takada .................. B60Q 1/072 362/523

FOREIGN PATENT DOCUMENTS

| | | | |
|---|---|---|---|
| CA | 2180504 C * | 11/2003 | ............. F21S 45/33 |
| JP | 2014216150 A * | 11/2014 | ............... B62J 6/02 |

OTHER PUBLICATIONS

Controlling Head-Lamp Aim (Year: 1970).*
Vision-based detection and tracking of vehicles to the rear with perspective correction in low-light conditions (Year: 2010).*

* cited by examiner

*Primary Examiner* — Thien T Mai
(74) *Attorney, Agent, or Firm* — Merchant & Gould, P. C.

(57) ABSTRACT

A method of adjusting a headlamp assembly of an off-road vehicle (ORV), the headlamp assembly connectable to a body panel of the ORV, and including a headlamp for emitting a light beam and a mounting portion. The method includes: determining a light beam center axis position of the light beam relative to the headlamp assembly; defining a position of the body panel; determining an aimed position of the headlamp assembly relative to body panel; determining a distance between a position of the mounting portion of the headlamp assembly and a position of the body panel; providing an adjustment stopper having a length substantially equal to the distance between the headlamp assembly and the body panel; and inserting the adjustment stopper in a space between the headlamp assembly and the body panel.

20 Claims, 14 Drawing Sheets

126a

OFF-ROAD VEHICLE HEADLAMP AIMING AND ADJUSTMENT

RELATED CASES

This application claims priority to U.S. Provisional Application 63/436,147 filed Dec. 30, 2022, entitled OFF-ROAD VEHICLE HEADLAMP AIMING AND ADJUSTMENT, the contents of which are expressly incorporated by reference herein.

FIELD OF THE DISCLOSURE

This disclosure relates generally to headlamp aiming and adjustment devices, systems and methods, and more specifically, to devices, systems and methods for consistently aiming headlamps of off-road vehicles.

BACKGROUND

Proper vehicle headlamp aiming can be a tedious, repetitive process that consumes considerable time and effort. Typically, a technician or vehicle owner turns various adjusting screws to affect the direction of the light beam of a vehicle headlamp assembly until the output light beam is aimed at a particular point ahead of the vehicle and above a roadway surface. For automobiles and trucks designed for use on roadways, automotive manufacturers initially adjust headlamp assemblies during the manufacturing process to meet governmental rules and guidelines, such as those promulgated by the Department of Transportation. As such, the headlamps of an automobile are aimed relatively accurately upon leaving the factory. To accomplish this task of initial headlamp aiming at the time of manufacture, manufacturers in the automotive industry employ sophisticated and expensive machines to precisely fit and adjust headlamps in the vehicles to meet required standards for automobiles.

However, in the off-road vehicle (ORV) (also generally referred to as "off-highway vehicle" or OHV) industry, vehicles are not generally required to meet the same stringent requirements as licensed vehicles intended to be driven on roadways. As such, the headlamp aiming practices for ORVs, such as all-terrain vehicles (ATVs), side-by-side or utility terrain vehicles (UTVs), off-highway motorcycles, and so on, are typically based on voluntary standards, guidelines and practices. These voluntary standards, in combination with the high-cost of automation, allow ORV manufacturers to rely on manual adjustment of headlamps either at the factory, or more typically, at a dealership after delivery of the ORV. When performing manual adjustment of headlamps, and particularly during manufacturing, not only may manual adjustment result in poor aiming of headlamps, the adjusters can also easily be over tightened and damaged, requiring replacement of an entire vehicle fascia.

Further, because headlamp aiming is such a time-consuming process, manufacturers, dealerships, and even customers may never take the time and effort to properly aim the headlamps of their ORVs.

SUMMARY

Embodiments of the present disclosure address the deficiencies in the ORV industry by providing devices, systems and methods of quickly and conveniently aiming ORV headlamps during, and even after, manufacture of the ORV.

An embodiment of the disclosure is directed to a method of headlight aiming that entails using known vehicle component dimensions, including adjusting components and light beam characteristics to orient and aim headlamps to a nominal position. An adjustment stopper or collar, is created to limit adjustment and easily set the headlamp position without further measurement or adjustment during the manufacturing process. The adjustment stopper is designed such that, when fixed to the vehicle, the headlight beam will be at nominal aiming. The adjustment stopper is installed around a threaded rod or screw of the adjuster in between the body fascia boss and the headlamp mounting surface. The headlamp assembly is properly positioned, or aimed, when the aiming adjuster is adjusted to achieve a desired gap size between the body fascia and the headlamp assembly, which is ensured by the adjustment stopper positioned in the space or gap between the fascia and the headlamp assembly, which limits movement of the headlamp assembly.

An embodiment of the disclosure includes a method of adjusting a headlamp assembly of an off-road vehicle (ORV), the headlamp assembly connectable to a component of the ORV, and including a headlamp for emitting a light beam defining a center axis and a mounting portion, comprising: determining a light beam center axis position relative to the headlamp assembly; defining a position of the component of the ORV; determining an aimed position of the headlamp assembly relative to the position of the component of the ORV; determining a distance between the mounting portion of the headlamp assembly and a mounting portion of the component of the ORV; providing an adjustment stopper having a length substantially equal to the distance between the mounting portion of the headlamp assembly and the mounting portion of the component of the ORV; and inserting the adjustment stopper in a space between the mounting portion of the headlamp and the mounting portion of the component of the ORV.

Another embodiment of the disclosure is a method of adjusting a position of a headlamp assembly to aim a headlamp of an off-road vehicle (ORV), comprising: receiving a first adjustment stopper configured to attach to a first aiming adjuster of the ORV; attaching the first adjustment stopper to the first aiming adjuster of the ORV in a first space between a front portion of the ORV and a first portion of the headlamp assembly; adjusting the first aiming adjuster to decrease a first distance between the headlamp assembly and the front portion of the ORV; and ceasing adjustment of the first aiming adjuster when the front portion of the ORV and the first portion of the headlamp assembly are both in contact with the first adjustment stopper.

Another embodiment of the disclosure includes a headlamp adjustment and aiming system for an off-road vehicle (ORV), comprising: a headlamp assembly including a headlamp housing, a headlamp configured to output a light beam, and a mounting portion; a rotatable aiming adjuster including a first end connectable to the mounting portion of the headlamp assembly and a second end connectable to a portion of the ORV, the aiming adjuster configured to move the mounting portion in a first direction of the first end toward the second end when rotated; and an adjustment stopper configured to attach to a portion of the rotatable aiming adjuster between the adjuster first and second ends and to limit the movement of the mounting portion in the first direction.

Another embodiment of the disclosure includes an adjustment stopper for a headlamp aiming system, comprising: a body portion including a first end and a second the body portion defining a central axis extending between the first end and the second end; an entrance slot defined in the body portion and extending from the first end to the second end and radially offset from the central axis; a central channel defined in the body portion and extending along the central axis from the first end to the second end; and wherein an outer width of the entrance slot is greater than an inner width of the entrance slot, and the inner width of the entrance slot is less than a diameter of the central channel.

BRIEF DESCRIPTION OF THE DRAWINGS

The disclosure can be understood in consideration of the following detailed description of various embodiments in connection with the accompanying drawings, in which.

DETAILED DESCRIPTION

Figure 1:
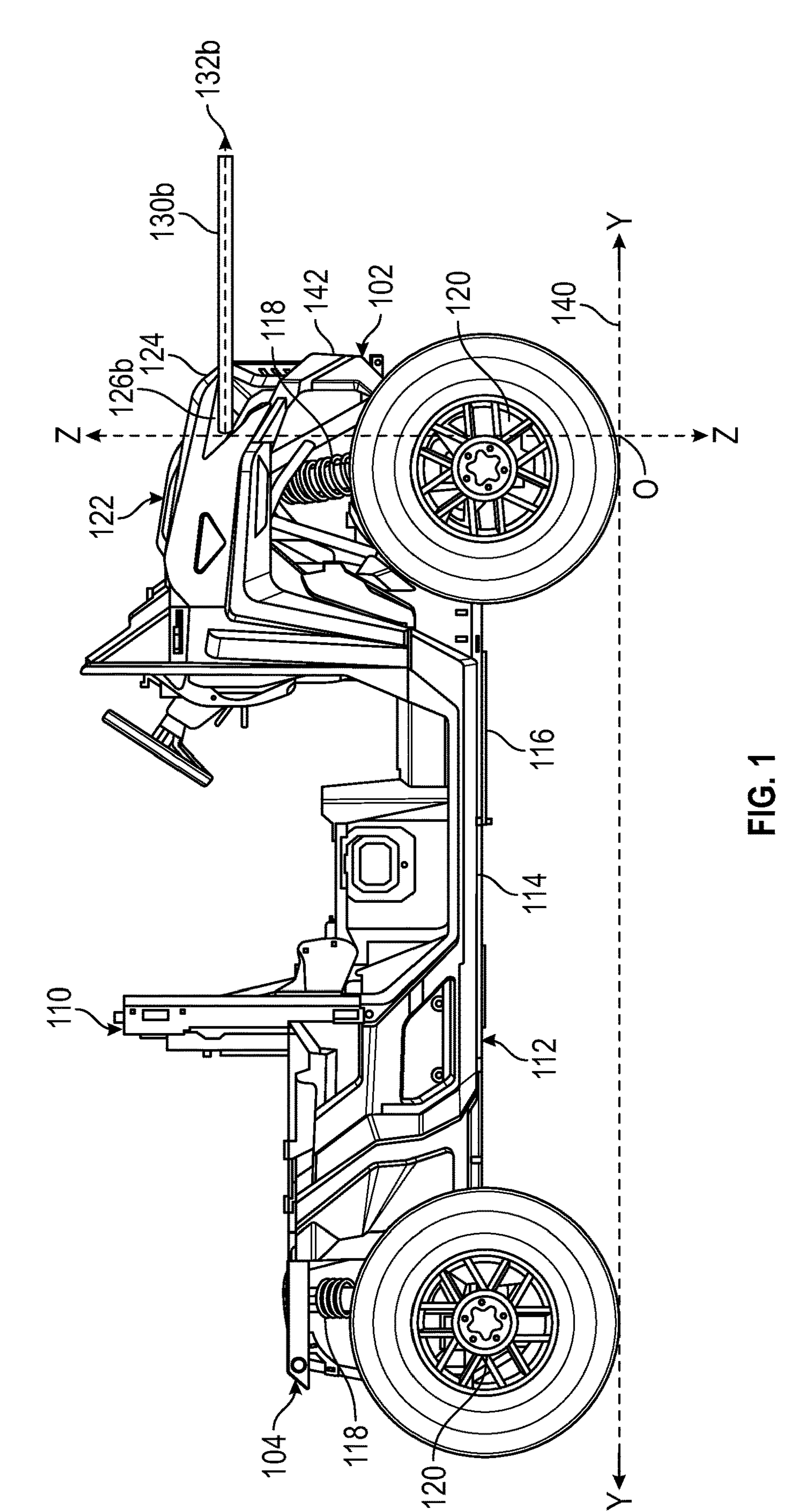
FIG. 1 is right-side view of a partially-assembled off-road vehicle (ORV) with a headlamp light beam projecting parallel to a ground plane, according to an embodiment of the disclosure.
Figure 2:
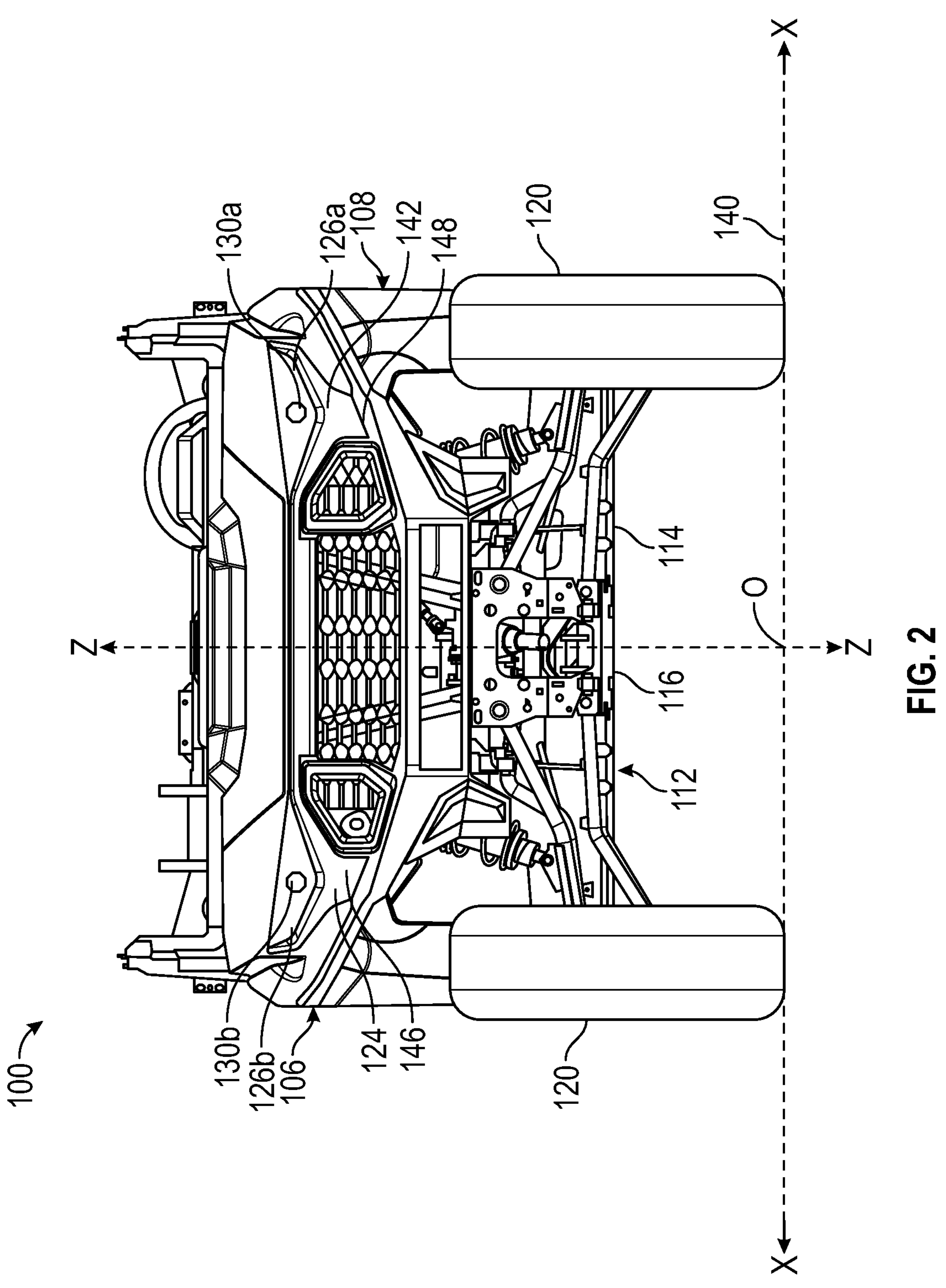
FIG. 2 is a front view of the partially-assembled ORV of FIG. 1, according to an embodiment of the disclosure.
Figure 3:
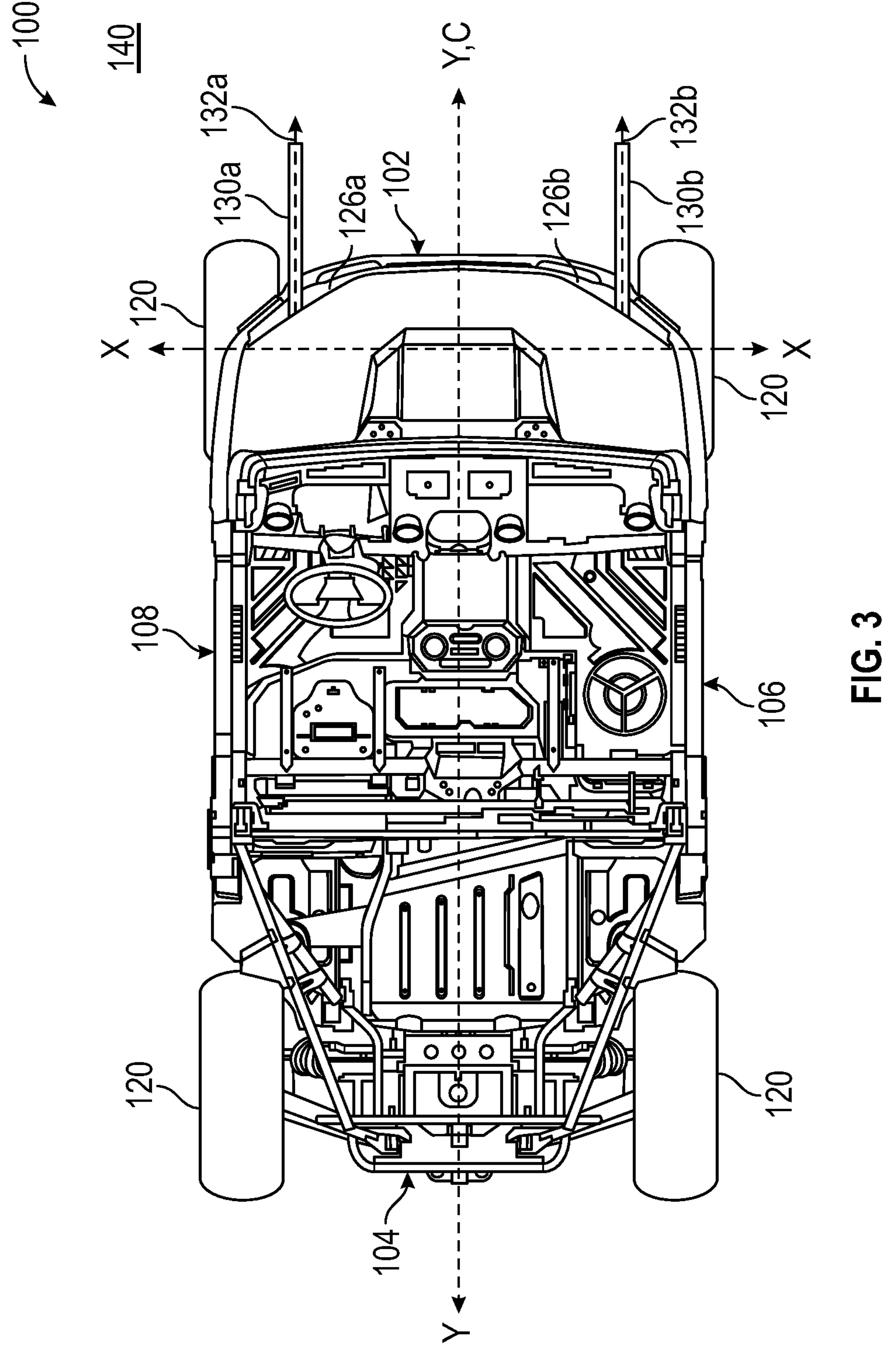
FIG. 3 is a top view of the partially-assembled ORV of FIGS. 1 and 2, according to an embodiment of the disclosure.

FIGS. 1-3 depict an embodiment of a partially-assembled off-road vehicle (ORV) 100 according to an embodiment of the disclosure. The term "off-road vehicle" or "ORV" herein will be understood to refer to vehicles whose primary purpose is to travel on terrain other than paved roadways, and include vehicles such as all-terrain vehicles (ATVs), side-by-side or utility terrain vehicles (UTVs), off-highway motorcycles (OHMs), snowmobiles, and similar such vehicles. The depicted embodiment of ORV 100 is a side-by-side UTV, though it will be understood that ORV 100 may comprise other off-road vehicle types. In FIGS. 1-3, ORV 100 is depicted with most of its body panels removed for illustrative purposes.

In an embodiment, ORV 100 comprises front end 102, rear end 104, left side 106, right side 108, top side 110 and bottom side 112. ORV centerline C extends between front end 102 and rear end 104. ORV 100 also comprises a variety of components that include, but are not limited to, frame 114, skid plate 116, suspension system 118, wheels 120, body panels 122, including front panel or fascia 124, and one or more headlamp assemblies, such as headlamp assemblies 126*a* and 126*b* (collectively, headlamp assemblies 126). Headlamp assemblies 126 are mounted to front fascia 124 at front end 102; fascia 124, skid plate 116 and suspension system 118 are mounted to frame 114, and four wheels 120 are mounted to suspension system 118.

Headlamp assemblies 126 in an embodiment, and as depicted, include a first or right-side headlamp assembly 126*a* configured to emit first light beam 130*a* defining a first light beam center axis 132*a* and a second or left-side headlamp assembly 126*b* configured to emit second light beam 130*b* defining a second light beam center axis 132*b*.

Locations or positions of the various components of ORV 100 are defined in a three-dimensional Cartesian coordinate system defining X, Y and Z axes. Axis X extends between left side 106 and right side 108; axis Y extends between front end 102 and rear end 104; and axis Z extends between top side 110 and bottom side 112. As will become more evident based on the further explanation below, as long as the position of ORV 100 is defined within the coordinate system, the definition of the coordinate-system relative to ORV 100 can vary. The origin of the coordinate system may be defined at a point "O" in the ground plane that lies in the X-Y plane, and which is midway between the pair of headlamp assemblies 126 along the X axis.

In an embodiment, the X-Y plane, which includes the X and Y axes, defines ground plane 140. Wheels 120, and hence ORV 100, rest on a predefined ground plane 140. Locations of various components of ORV 100, and particularly front fascia 124 and headlight assemblies 126 may be defined in the above-defined coordinate system. In turn, and as further described below, these defined locations or positions may be used to align and adjust headlamp assemblies 126 relative to front fascia 124 and ground plane 140, thusly aiming headlamp light beams 130.

Figure 4:
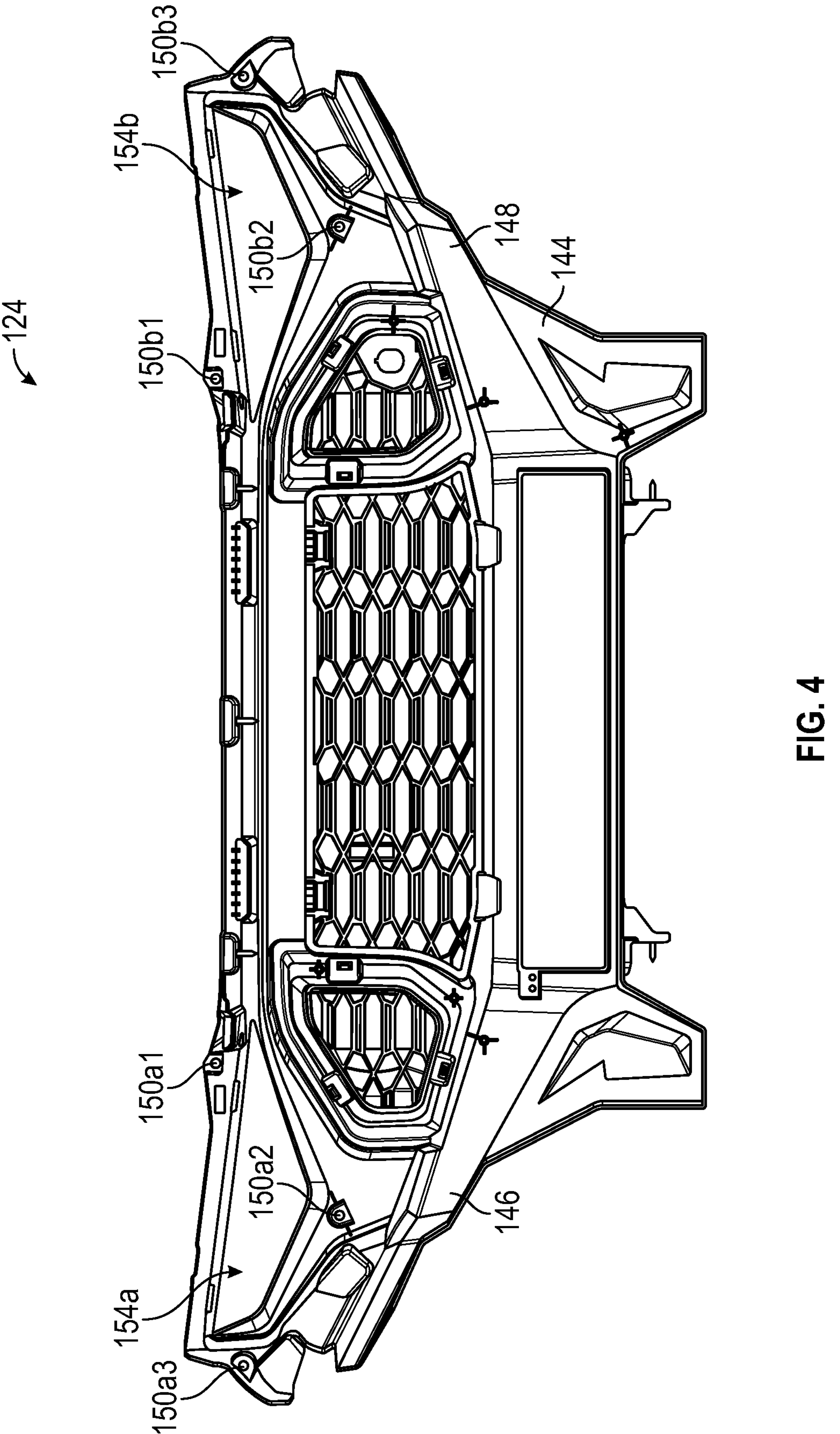
FIG. 4 is a rear view of a front fascia body panel of the ORV of FIG. 1, according to an embodiment of the disclosure.

Referring also to FIG. 4, a rear view of front fascia 124 is depicted. Front fascia 124 may be one of a body panel 122, which may be comprised of plastic or similar material, configured to cover front portions of ORV 100. More generally, front fascia 124 is also understood to be a portion of ORV 100 that connects to, holds, and supports headlamp assemblies 126.

Figure 5:
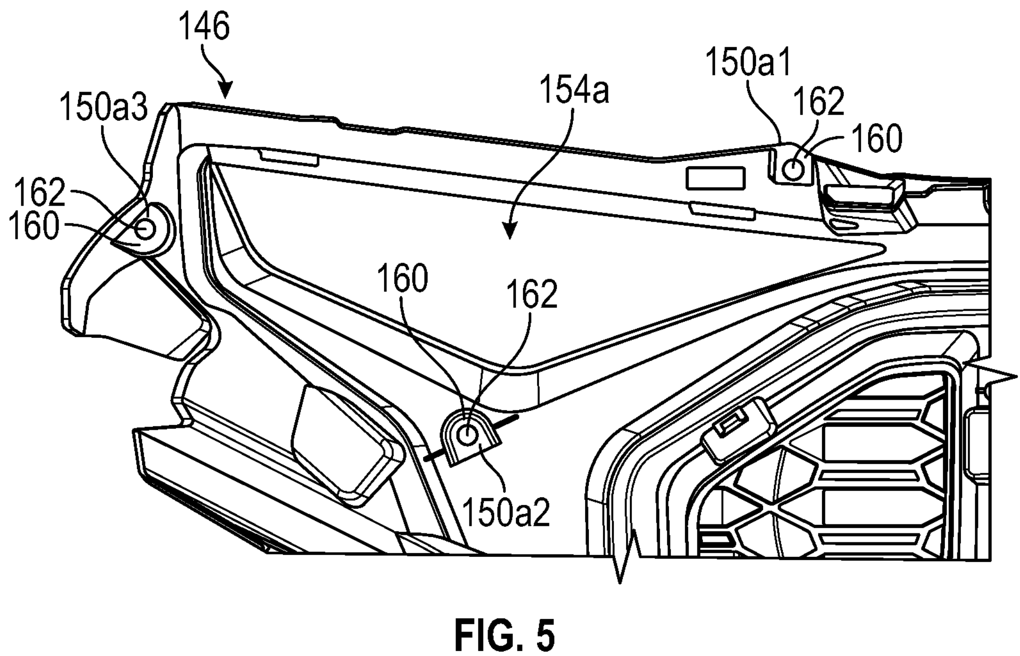
FIG. 5 is a rear view of a right corner of the front fascia body panel of FIG. 4.
Figure 6:
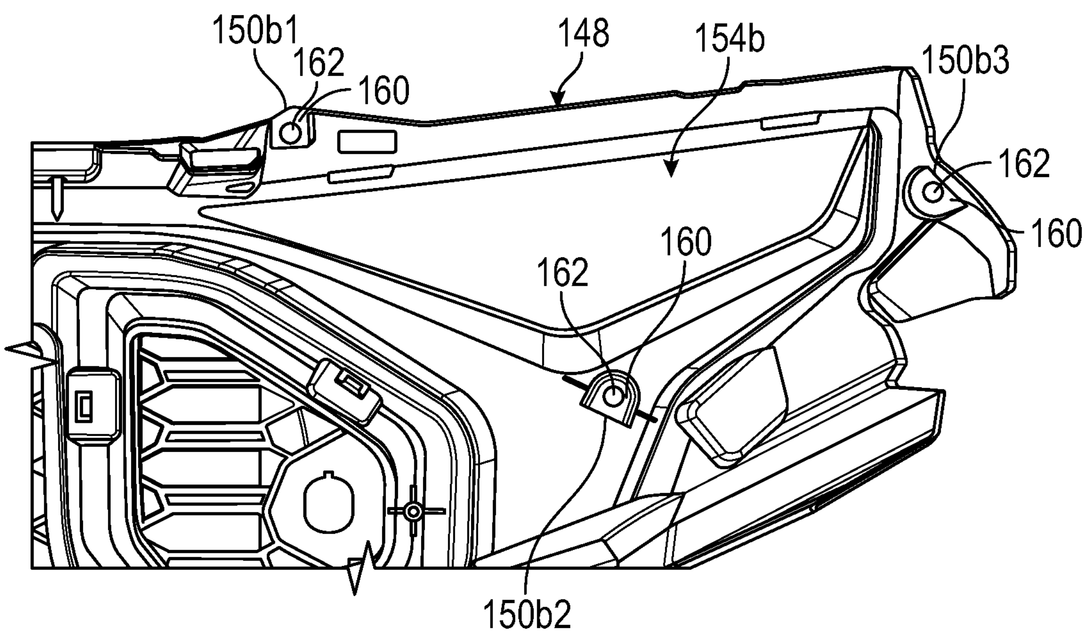
FIG. 6 is a rear view of a left corner of the front fascia body panel of FIG. 4.

Referring to FIGS. 4-6, in an embodiment, front fascia 124 includes front side 142 (see FIGS. 1 and 2), rear side 144, first or right side 146 and second or left side 148. Front fascia 124 also includes mounting portions 150 (or "mounts"), including first or right-side headlamp-connecting mounts 150*a* for connecting to fascia 124 to headlamp assembly 126*a*, which includes mounts 150*a*1, 150*a*2 and 150*a*3 and second or left-side headlamp-connecting mounts 150*b*, including 150*b*1, 150*b*2 and 150*b*3, for connecting to headlamp assembly 126*b*.

Front fascia 124 also defines openings 154, including a first or right-side headlamp opening 154*a* and a second or left-side headlamp opening 154*b*.

In an embodiment, and as depicted, first headlamp-connecting mounts 150*a* include three headlamp-connecting mounts 150*a*, namely, headlamp-connecting mount 150*a*1, 150*a*2 and 150*a*3; second headlamp-connecting mounts 150*b* include three headlamp-connecting mounts 150*b*, namely, headlamp-connecting mount 150*b*1, 150*b*2 and 150*b*3. In other embodiments, first headlamp-connecting mounts 150*a* and second headlamp-connecting mounts 150*b* may include more or fewer than three mounts each, such as only one mount, two mounts or four or more mounts. The number of mounts 150*a*, 150*b* may be determined in part by headlamp size, including length, and weight, with more mounts included for larger, heavier headlamp assemblies 126.

In an embodiment, each of mounts 150*a*, 150*b* includes a mounting surface 160 and defines an aperture 162, which in an embodiment, comprises a through hole. However, in other embodiments, mounts 150 and 152 may comprise other structures configured to receive, connect to, or couple with a headlamp adjuster connected to headlamp assemblies 126*a* and 126*b*, as described further below.

Referring to FIGS. 7-10, embodiments of first or right-side headlamp assembly 126*a* and second or left-side headlamp assembly 126*b* are depicted. In an embodiment, headlamp assemblies 126*a* and 126*b* may be substantially similar, and in the depicted embodiment are structural mirror images of one another.

Figure 7:
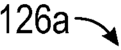
FIG. 7 is a perspective view of a first or right-side headlamp assembly with light beam, according to an embodiment of the disclosure.
Figure 7:
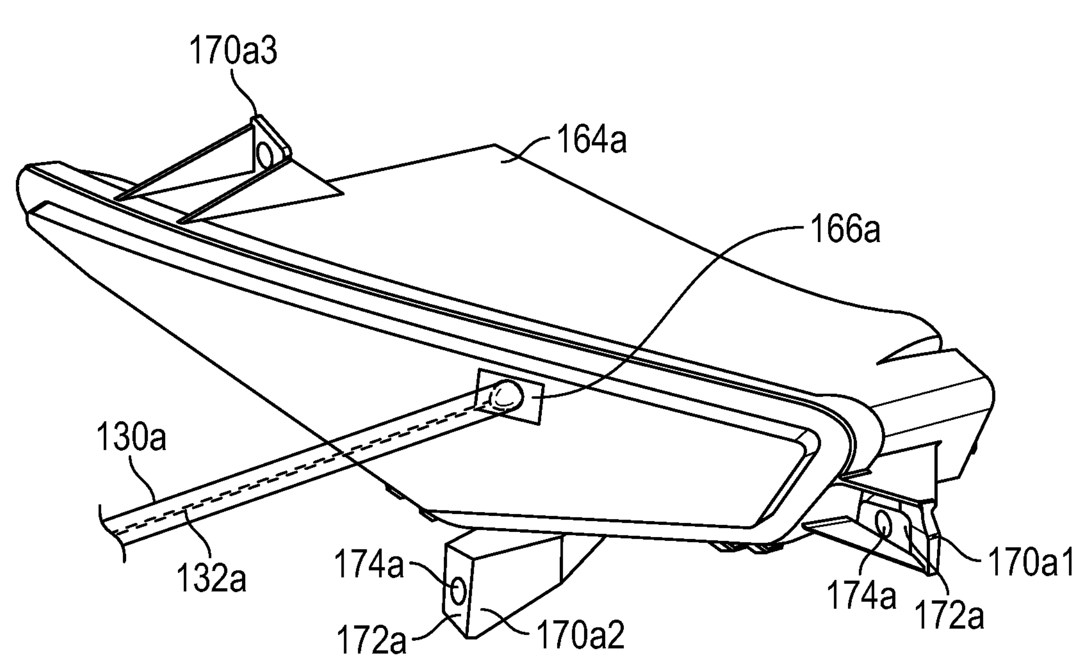
Figure 8:
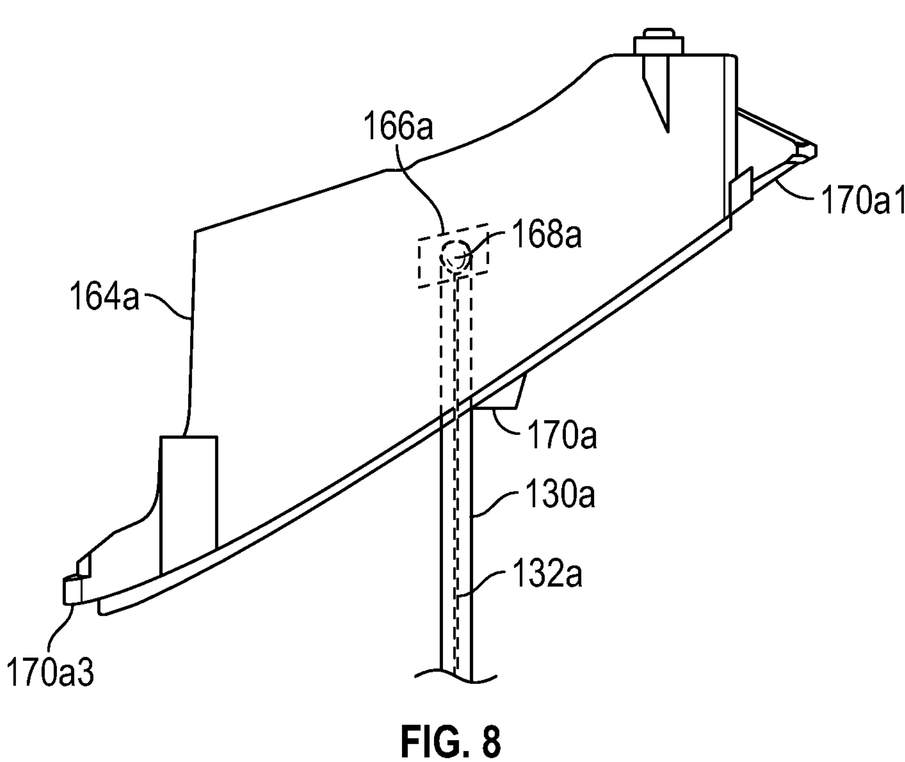
FIG. 8 is a top view of the first or right-side headlamp assembly of FIG. 7.

Referring specifically to FIGS. 7 and 8, first headlamp assembly 126*a* is depicted emitting first light beam 130*a* along first light-beam center axis 132*a*, in a perspective view and a top view, respectively. In an embodiment, first headlamp assembly 126*a* includes housing 164*a* with one or more mounting portions 170*a*, and lamp 166*a* with emitter portion 168*a*. First headlamp assembly 126*a* also includes a front side and a rear side.

Lamp 166*a* is mounted to housing 164*a* and is partially or completely within a cavity defined by housing 164*a*, such that if a position of housing 164*a* is changed or moved, lamp 166*a* being fixed to housing 164*a* moves commensurately. In an embodiment, lamp 166*a* may be a lamp assembly having a light emitter 168*a*, such as one or more light-emitting diodes (LEDs), a halogen lamp, high-intensity discharge (HID) lamp, incandescent lamp, or other suitable light emission source. Lamp 166*a* may also include electronic components, such as heat sinks, controllers, and other suitable, known electronic circuitry and componentry.

Light emitted from lamp 166*a* and its emitter 168*a* is referred to generally as a "light beam" 130*a* and is depicted in a substantially collimated beam or beam-like pattern for the sake of illustration, though it will be understood that light from lamp 166*a* may form a variety of radiation patterns, including conical patterns, depending on the light source, reflectors, and other lamp 166*a*, emitter 168*a* and headlamp assembly components and characteristics. In any case, light-beam center axis 132*a* is understood to be the central or optical axis, which may correspond to a mechanical central axis of emitter 168*a*, which may be an LED.

A location of light emitter 168*a* may be defined within the 3D coordinate system when headlamp assembly 126*a* is mounted to front fascia 124. Although actual light from emitter 168*a* of lamp 166*a* will be emitted from a finite area or region of lamp 166*a*, such as from the surface of an LED chip, the location of light emitter 168*a* may be assumed to be a point within headlamp assembly 126*a* that is a central point of such an area or region, and/or that point where a highest concentration of photons is released from the lamp surface.

In the embodiment depicted, headlamp assembly 126*a* includes three mounting portions 170*a*, namely, 170*a*1, 170*a*2 and 170*a*3. However, headlamp assembly 126*a* may include more or fewer mounting portions 170*a*, such as one, two, four or more mounting portions, depending on factors such as headlamp assembly size and weight and other design considerations.

In an embodiment each mounting portion 170*a* comprises a tab or boss having a front mounting surface 172*a* and hole 174*a*. Hole 174*a* may be a through hole in an embodiment.

Figure 9:
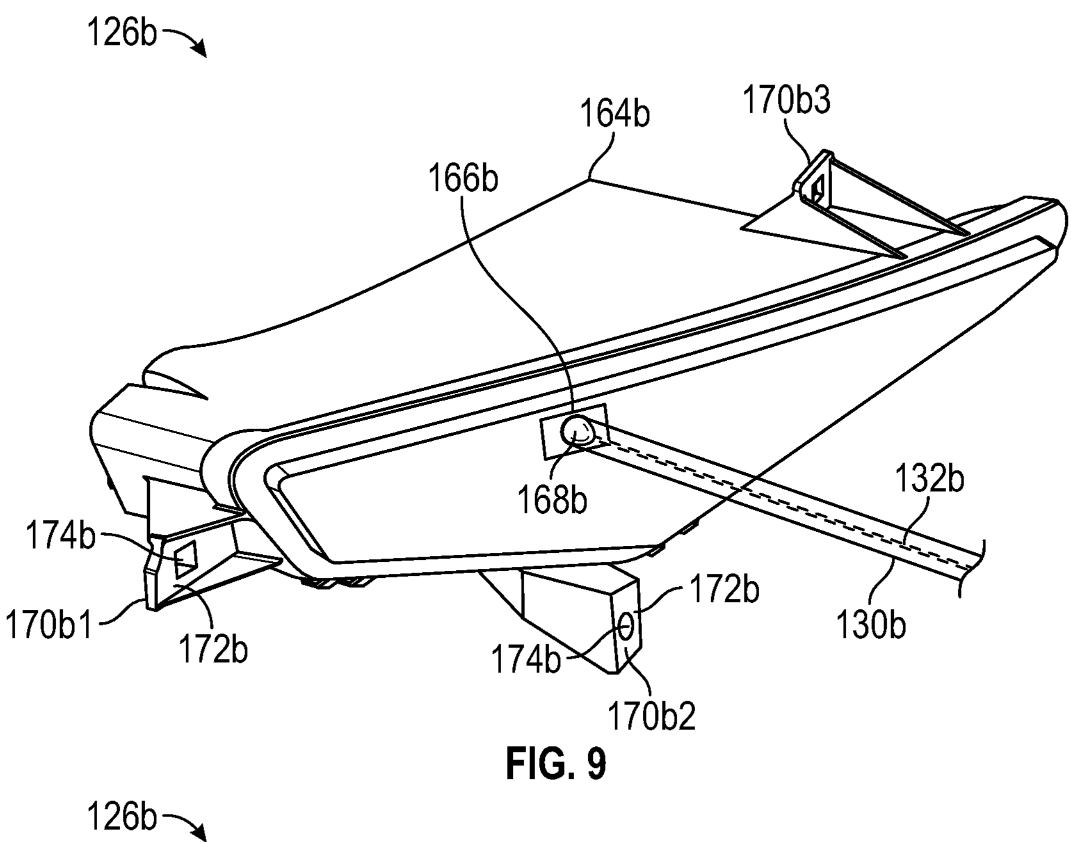
FIG. 9 is a perspective view of a second or left-side headlamp assembly with light beam, according to an embodiment of the disclosure.
Figure 10:
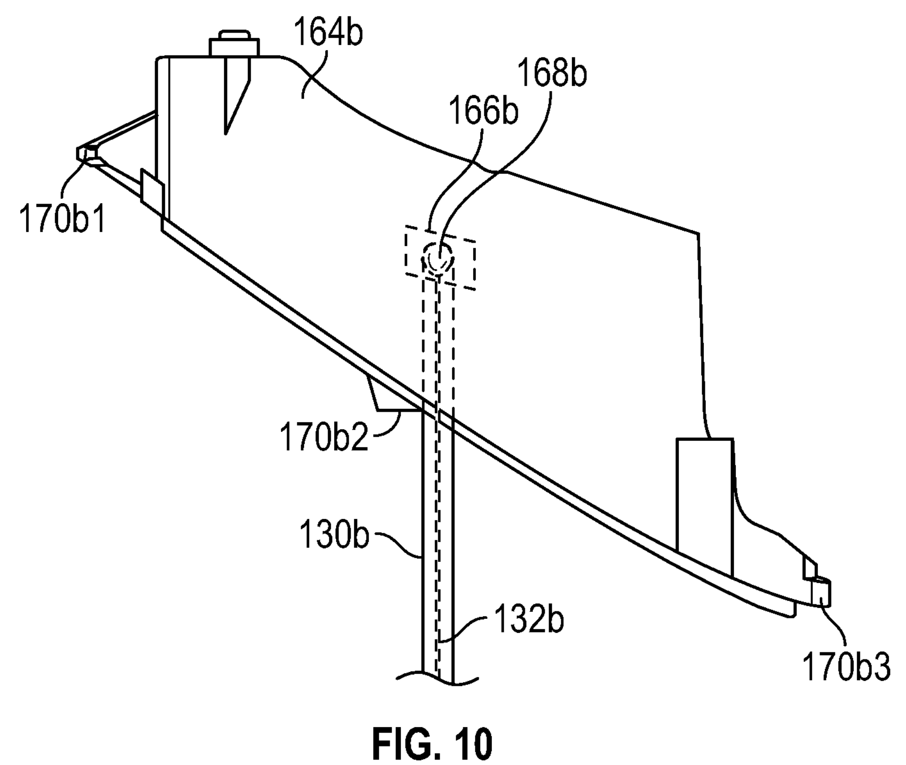
FIG. 10 is a perspective view of the second or left-side headlamp assembly of FIG. 9.

Referring to FIGS. 9 and 10, second headlamp assembly 126*b* is depicted emitting second light beam 130*b* along second light-beam center axis 132*b* in a perspective view and a top view, respectively. In an embodiment, second headlamp assembly 126*b* includes housing 164*b* with one or more mounting portions 170*b*, and lamp 166*b* with emitter portion 168*b*. Second headlamp assembly 126*b* also includes front side 172*b* and hole 174*b*.

Lamp 166*b* is mounted to housing 164*b* and is partially or completely within a cavity defined by housing 164*b*, such that if a position of housing 164*b* is changed or moved, lamp 166*b*, being fixed to housing 164*b*, moves commensurately. In an embodiment, lamp 166*b* may be a lamp assembly having a light emitter 168*b*, such as one or more light-emitting diodes (LEDs), a halogen lamp, high-intensity discharge (HID) lamp, incandescent lamp, or other suitable light emission source. Lamp 166*b* may also include electronic components, such as heat sinks, controllers, and other suitable, known electronic circuitry and componentry.

Light emitted from lamp 166*b* and its emitter 168*b* is referred to generally as "light beam" 130*a* and depicted in a beam-like pattern for the sake of illustration, though it will be understood that light from lamp 166*b* may form a variety of radiation patterns, including conical patterns, depending on the light source, reflectors, and other lamp 166*b*, emitter 168*b* and headlamp assembly components. In any case, light-beam center axis 132*b* is understood to be the central or optical axis, which may correspond to a mechanical central axis of emitter 168*b*, which may be an LED.

A location of light emitter 168*b* may be defined within the 3D coordinate system when headlamp assembly 126*b* is mounted to front fascia 124. Although actual light from emitter 168*b* of lamp 166*b* will be emitted from a finite area or region of lamp 166*a*, such as from the surface of an LED chip, the location of light emitter 168*b* may be assumed to be a point within headlamp assembly 126*b* that is a central point of such an area or region, and/or that point where a highest concentration of photons is released from the lamp surface.

In the embodiment depicted, headlamp assembly 126*b* includes three mounting portions 170*b*, namely, 170*b*1, 170*b*2 and 170*b*3. However, headlamp assembly 126*b* may include more or fewer mounting portions 170*b*, such as one, two, four or more mounting portions, depending on factors such as headlamp assembly size and weight and other design considerations.

In an embodiment each mounting portion 170*b* comprises a tab or boss having a front mounting surface 172*b* and hole 174*b*. Hole 174*b* may be a through hole in an embodiment.

Figure 11:
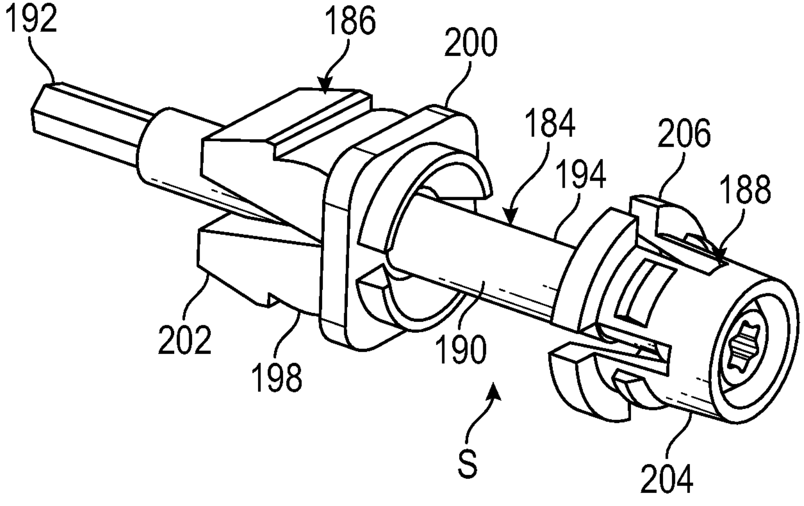
FIG. 11 is a perspective view of an aiming adjuster, according to an embodiment of the disclosure.
Figure 12:
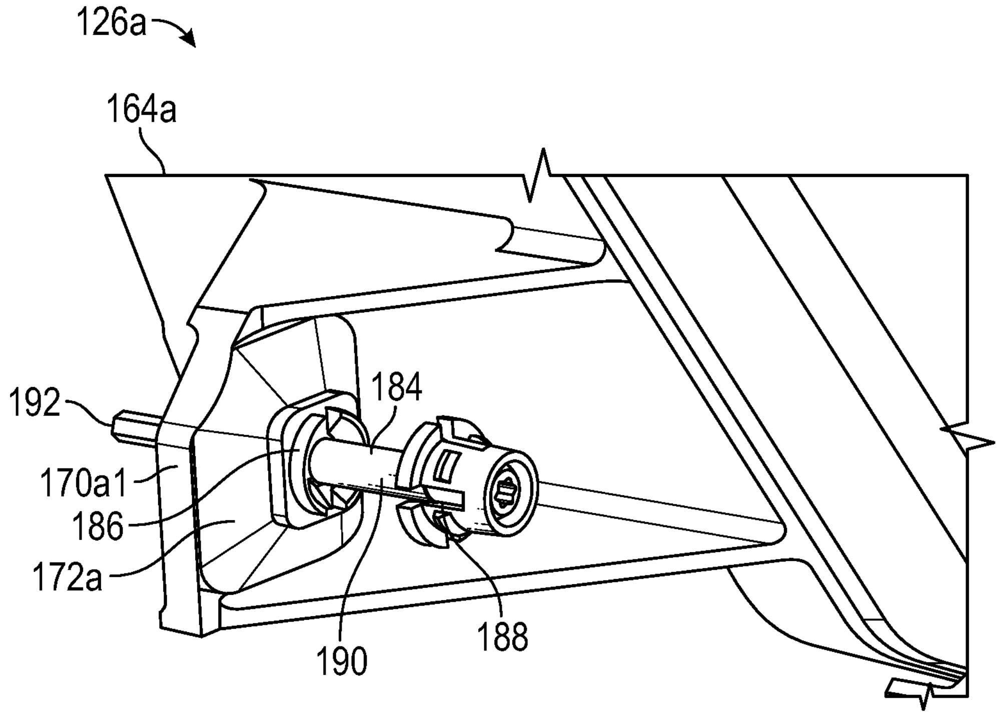
FIG. 12 is a perspective view of the aiming adjuster of FIG. 11 connected to a mounting portion of a headlamp assembly, according to an embodiment of the disclosure.

Referring to FIGS. 11 and 12, headlamp assemblies 126, including 126*a* and 126*b*, may also include attached headlamp-to-fascia connecting and headlamp-aiming adjusters 180, referred to herein as headlamp-aiming adjusters 180 or aiming adjuster 180. Aiming adjusters 180 may be connected to headlamp housings 164 at mounting portions 170 and to headlamp-connecting mounts 150 of fascia 124 (see also FIG. 4).

In an embodiment, headlamp-aiming adjuster 180 includes adjusting rod 184, headlamp-housing connector 186 and body-panel/fascia connector 188.

In this embodiment, adjusting rod 184 comprises shank portion 190, all or a portion of which may include external threads, first or adjusting end 192 and second or body-panel end 194. In an embodiment, headlamp-aiming adjuster 180 may also include a ball coupled to second end 194, wherein the ball is configured to fit into body-panel connector 188 such that adjusting rod 184 may pivot or swivel about body-panel connector 188. Headlamp-aiming adjuster 180 may comprise other embodiments including structures for making a connection between a headlamp assembly 126 and fascia 124, and for positioning headlamp assembly 126 in various locations relative to fascia 124, such that headlamp-aiming adjuster 180 is not intended to be limited to the embodiments specifically depicted and described herein.

Headlamp-housing connector 186, in an embodiment is configured to connect to headlamp housing 124 at mounts 170, and may include body portion 198 with flange portion 200. Body portion 198 and flange portion 200 define a through hole configured to receive adjusting rod 184 and its shank portion 190. In embodiment, the through hole is a threaded hole sized to mate with a threaded portion of adjusting rod and its shank portion 190. In an embodiment, body portion 198 includes a pair of flexible arms 202, one end of each arm being connected adjacent to flange portion 200, and another end not connected, such that flexible arms 202 may flex and pivot about their respective connected ends to facilitate insertion into, and fixation to, mounts 170 of headlamp housing 164 (FIGS. 7-10), as described further below.

Fascia or body-panel connector 188, in an embodiment, includes body portion 204 and flange portion 206, and may define slots 208, such that portions of body portion 204 form flexible arms. Body portion 204 is configured to receive second end 194 of adjusting rod 184.

Referring specifically to FIG. 12, headlamp-aiming adjuster 180 is depicted connected to first headlamp assembly 126*a* at mount 170*a*1. In this embodiment, arms 202 have been pushed through hole 174*a*, such that flange portion 200 is adjacent to, and in contact with, front surface 172*a*, and adjusting rod 184 extends through hole 174 of mount 170*a*1 of first headlamp assembly 126*a*. As such, headlamp-aiming adjuster 180 is attached to headlamp housing 164*a* of first headlamp assembly 126*a*.

Figure 13:
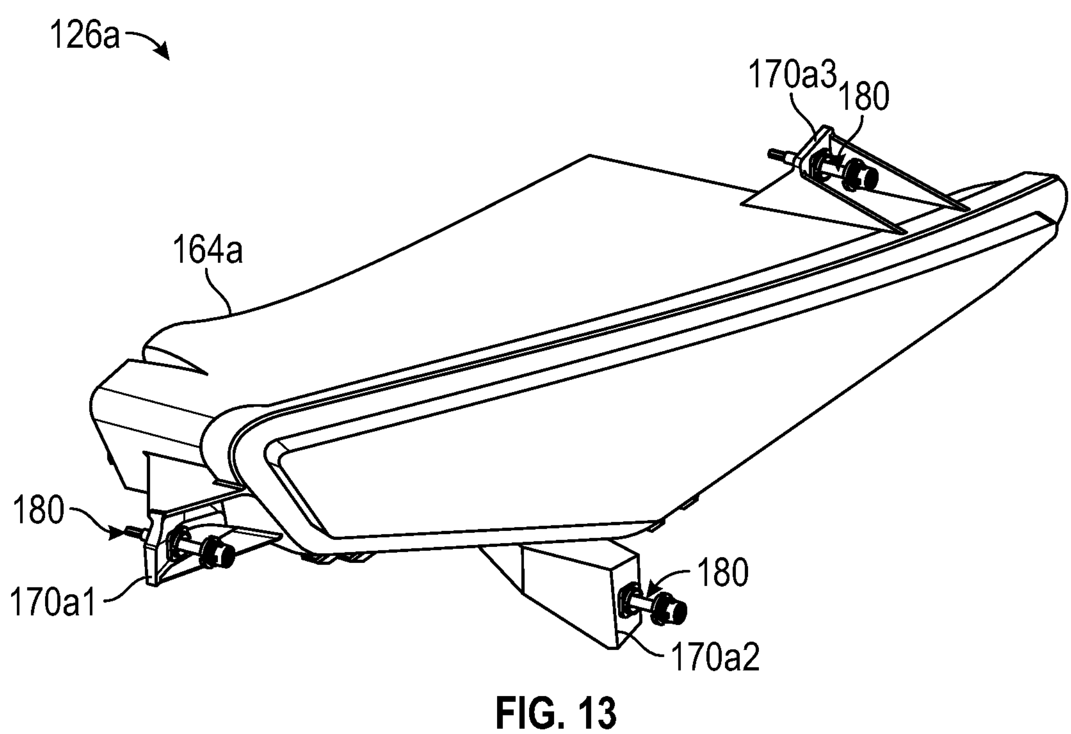
FIG. 13 is a perspective view of three aiming adjusters attached to three mounting portions of a headlamp assembly, according to an embodiment of the disclosure.

Referring also to FIG. 13, a headlamp-aiming adjuster 180 is similarly connect to mounts 150*a*2 and 150*a*3 of headlamp housing 164*a* of first headlamp assembly 126*a*. Additional headlamp-aiming adjusters 180 are similarly attached to mounts 150*b*1, 150*b*2 and 150*b*3 of headlamp housing 164*b* of second headlamp assembly 126*b*, such that each headlamp assembly 126 includes three headlamp-aiming adjusters 180 at mounts 170*a*1, 170*a*2 and 170*a*3.

Referring to FIG. 11 and also to FIGS. 4-6 and 14, body-panel or fascia connector 188 is configured to connect to a portion of ORV 100, which may be a body panel, such as front fascia 124. In an embodiment, body panel connector 188 is configured to connect to mounts 150 in front fascia 124. In one such embodiment, body portion 204 fits through hole 160 such that flanged portion 206 abuts a surface 162 of a mount 150, thereby connecting fascia connector 188 to mount 150, and connecting a headlamp-aiming adjuster 180 to mount 150 and front fascia 124.

Figure 14:
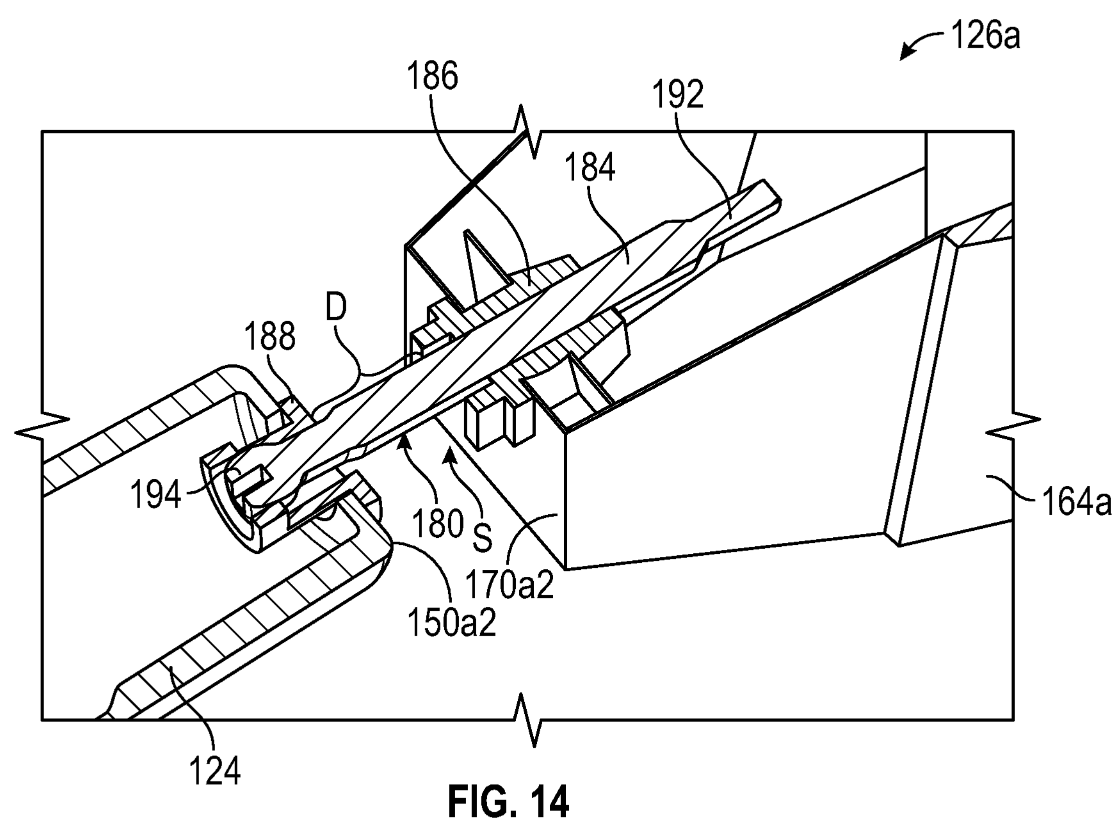
FIG. 14 is a sectional view of an aiming adjuster connecting a headlamp assembly and a front fascia, according to an embodiment of the disclosure.

Referring specifically to FIG. 14, an enlarged sectional view of a portion of front fascia 124 connected to first headlamp housing 164*a* of first headlamp assembly 126*a* via headlamp-aiming adjuster 180, is depicted. In this depiction, headlamp-housing connector 186 is connected to first headlamp housing 164*a* at mount 170*a*2. Fascia connector 188 is connected to fascia 124 at mount 150*a*2. Adjusting rod 184 extends between fascia 124 and headlamp housing 164*a*, and between headlamp-housing connector 186 and fascia connector 188. Headlamp-housing connector 186 is separated from fascia connector 188 by a distance D in a space S between fascia 124 and first headlamp housing 164*a*.

Similar connections are made between fascia 124 and first headlamp housing 164*a* at the other two mounting regions where a headlamp-aiming adjuster 180 is connected to mounts 150*a*1 and 170*a*1, and another headlamp-aiming adjuster 180 is connected to mounts 150*a*3 and 170*a*3. As such, first headlamp assembly 126*a* is connected to front fascia 124 at three points via three headlamp-aiming adjusters 180.

Similar connections are made using three headlamp-aiming adjusters 180 to connect second headlamp assembly 126*b* to front fascia 124.

In operation, when an adjusting rod 184 is rotated at adjusting end 192 in a first direction, which in an embodiment is a clockwise direction, a portion of a headlamp assembly 126 is moved towards, or closer to, front fascia 124. When adjusting rod 184 is rotated in a second direction, which in an embodiment is a counter-clockwise direction, that portion of the headlamp assembly 126 is moved away from, or further from front fascia 124. Any or all of the three connected adjusting rods 184 may be rotated to move portions of first headlamp assembly 126*a* relative to front fascia 124; any or all of the three connected adjusting rods 184 may be rotated to move portions of second headlamp assembly 126*b* relative to front fascia 124. Since light beams 130 illuminate along a known center axis 132 for each headlamp assembly, movement of the headlamp assembly 126 results in movement, or "aiming" of the light beam 130. For example, moving a bottom portion of first headlamp assembly 126*a* at mount 150*a*2 closer to front fascia 124 will aim light beam 130*a* more upwardly, while moving the bottom portion of first headlamp assembly 126*a* further from fascia 124 will cause light beam 130*a* to aim more downwardly. Similar movements and adjustments can be made to aim light beam 130*a* in a more right-to-left or left-to-right direction.

It is the adjustment of headlamp-aiming adjusters 180 at multiple connection points at each headlamp assembly 126, and the resultant relative position and orientation of headlamp assembly 126 to front fascia 124 that determines whether light beams are aimed in an appropriate or desirable direction. As described briefly above, if such adjustments are done manually and iteratively by an operator, the process can be tedious and time consuming.

However, methods of the present disclosure may be used to determine an orientation and position of headlamp assemblies 126 relative to front fascia 124, and to ground plane 140, prior to assembly of ORV 100, and to ensure consistent adjustment to the predetermined orientation and position through the use of an adjustment-limiting or locking device 220, referred to herein as an adjustment "stopper", as described further below, inserted into the space between headlamp assembly 126 and front fascia 124.

Figure 15:
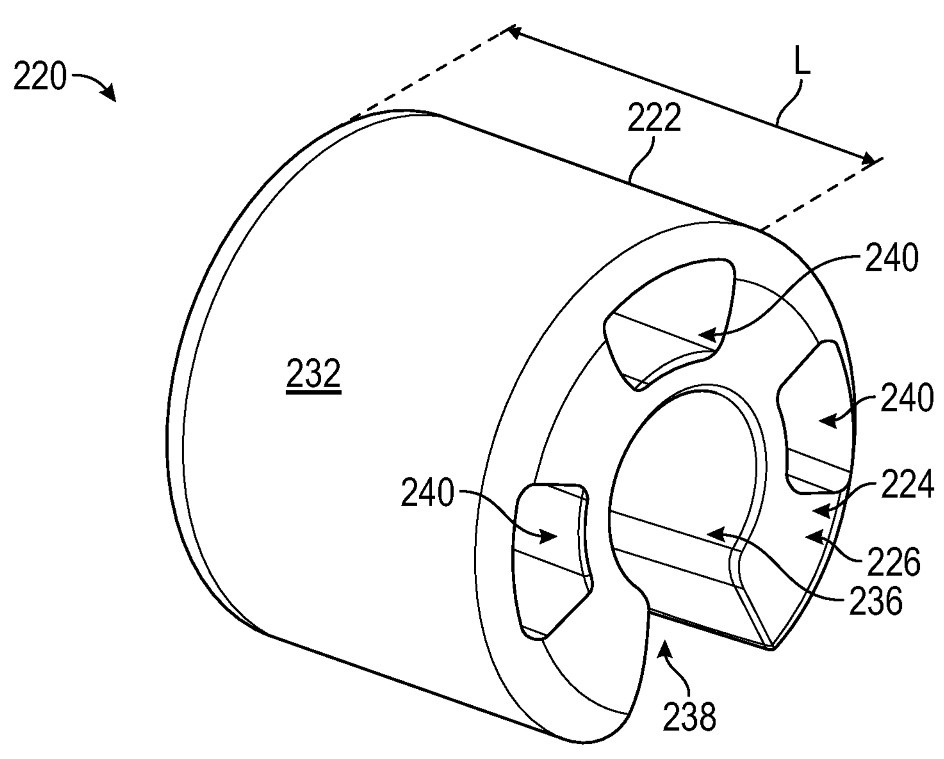
FIG. 15 is a perspective view of an adjustable stopper, according to an embodiment of the disclosure.
Figure 16:
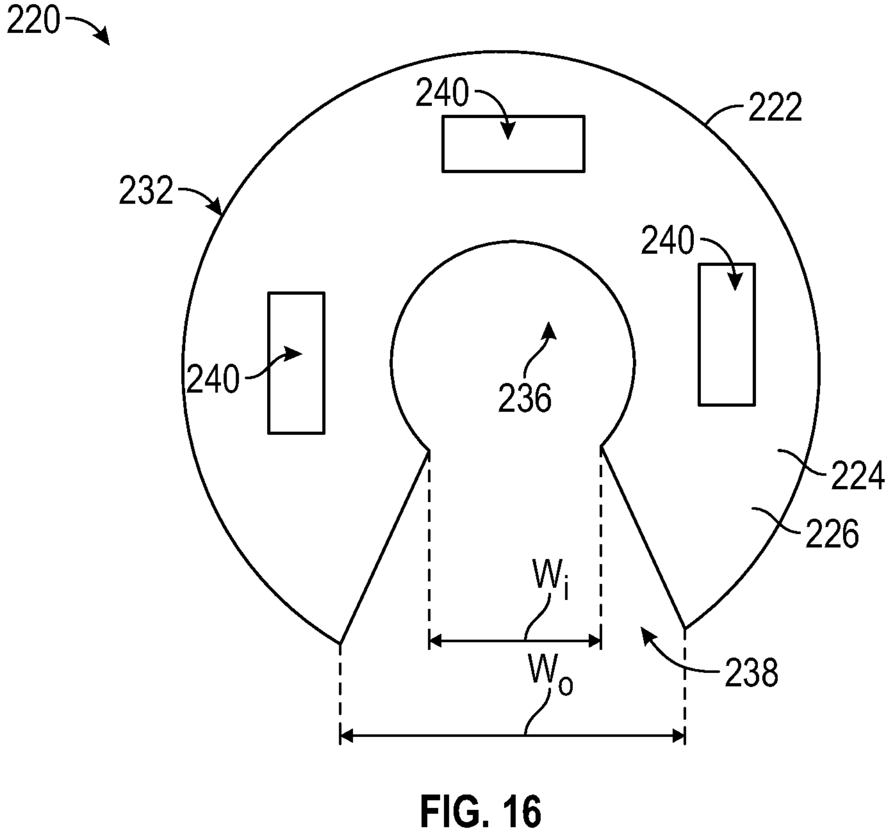
FIG. 16 is a top view of the adjustable stopper of FIG. 15.
Figure 17:
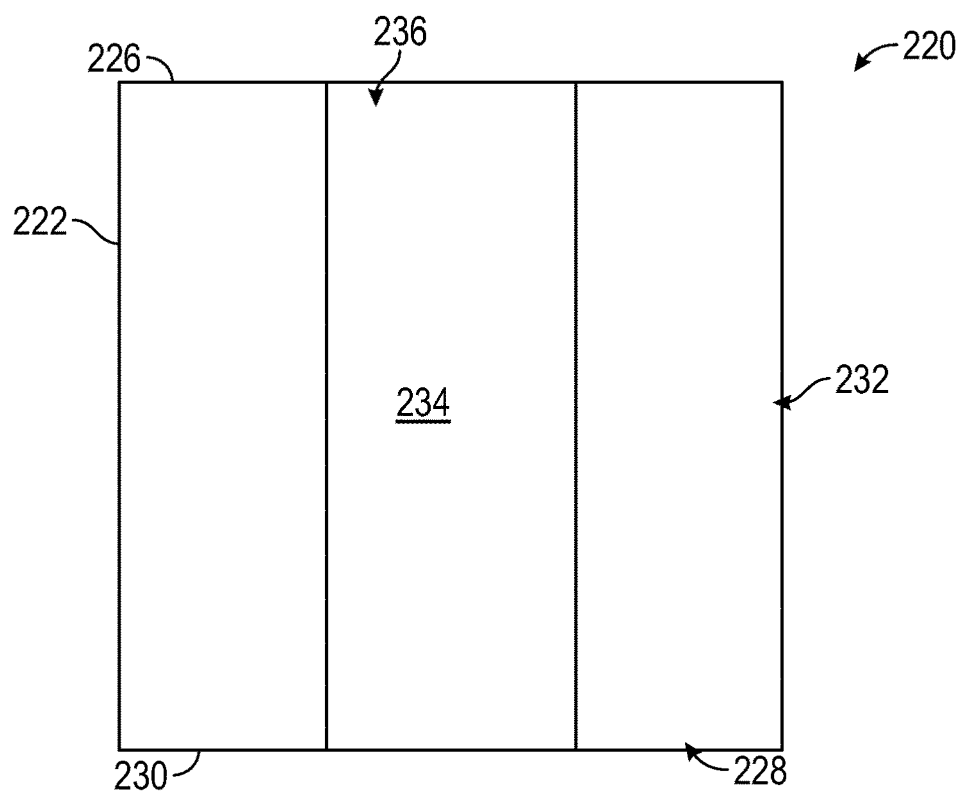
FIG. 17 is a side view of the adjustable stopper of FIG. 15.
Figure 18:
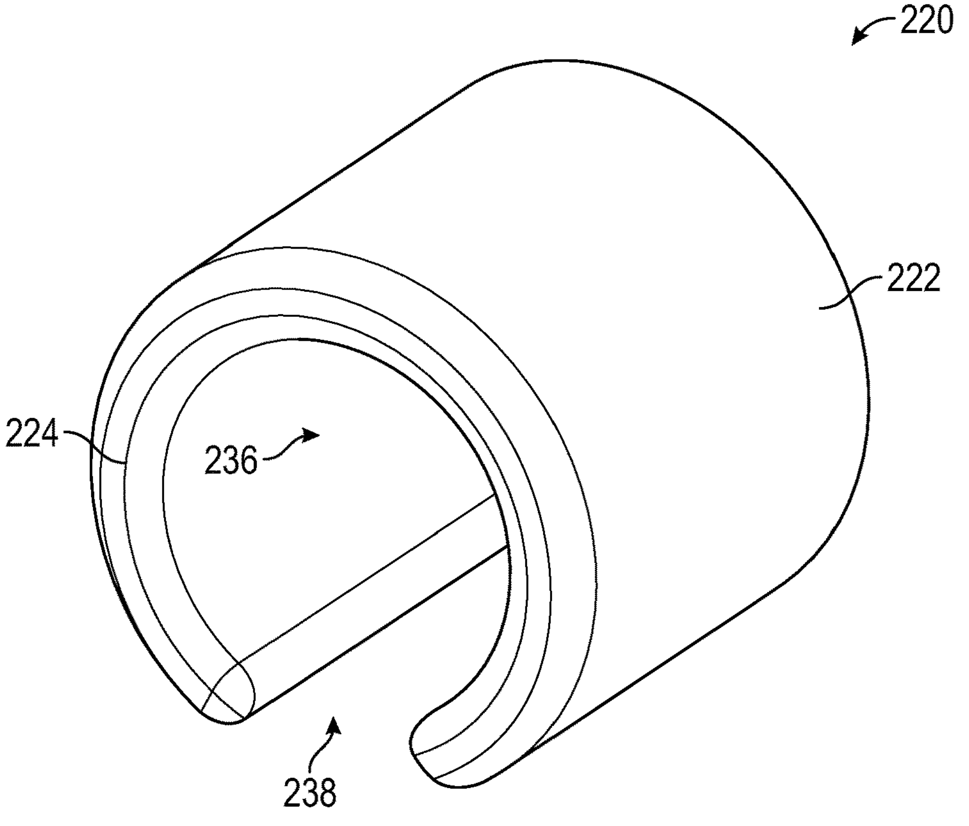
FIG. 18 is a perspective view of another embodiment of an adjustable stopper, according to an embodiment of the disclosure.

Referring to FIGS. 15-18, embodiments of adjustment stopper are depicted. FIGS. 15-17 depict a first embodiment of adjustment stopper 220; FIG. 18 depicts a second embodiment of adjustment stopper 220.

Referring to FIGS. 15-17, in an embodiment, adjustment stopper 220 forms a collar shape adapted to fit onto headlamp-aiming adjuster 180 to limit adjustment of headlamp-aiming adjuster 180 (FIG. 11), as described further below.

In an embodiment, adjustment stopper 220 comprises a generally cylindrical body portion 222 that includes first or headlamp-side end 224 with first end surface 226, second or body-panel side 228 with second end surface 230, outer circumferential surface 232 and inner surface 234. In an embodiment, and as depicted, body portion 222 defines central channel 236 and entrance slot 238. In some embodiments, body portion 222 may also define cavities 240.

Body portion 222 has a length L, and in an embodiment, and as depicted forms a generally cylindrical shape with substantially flat ends 224 and 228, though it will be understood that in other embodiments, body portion 222 may form other shapes, such as a rectangular cuboid, sphere, and so on. In an embodiment, body portion 222 may comprise a polymer material, such as polyethylene (PE), polyvinylchloride (PVC), nylon, or other types of polymers. In other embodiments, body portion 222 may comprise other materials, such as metal, suitable for connecting to headlamp-aiming adjuster 180 and/or for fitting between headlamp assembly 126 and front fascia 124 to form a stopper or limiting device, as explained further below. In an embodiment, a material of body portion 222 is selected to have sufficient flexibility for fitting onto adjuster 180, and may exhibit a Young's modulus within a range from about 0.1 gigapascal (GPa) to about 5 GPs, such as about 0.2 GPa to about 3 GPa.

Central channel 236 and entrance slot 238 extend from first end 224 to second end 228 and are in communication with each other to define a common space.

In an embodiment, central channel 236 is generally cylindrical and has a diameter that is substantially the same as a diameter of shank portion 190 of adjuster rod 184 of adjuster 180, to receive shank portion 190. In other embodiments, central channel 236 may have a diameter slightly smaller than a diameter of shank portion 190 so as to ensure a tight fit of shank portion 190 into central channel 236, though in other embodiments, a looser fit may be more desirable, such as for ease of assembly, such that a diameter of central channel 236 is slightly larger than a diameter of shank portion 190.

Entrance slot 238 may be wedge- or triangular shaped when viewed along a central axis A extending between first end 224 and second end 228, such that an outer width Wo of entrance slot 238 at a radially-outermost portion is greater than an inner width Wi of at a radially-innermost portion (closest to central channel 236). In one such embodiment, Wo is greater than a diameter of shank portion 190, and Wi is slightly less than a diameter of shank portion 190, and slightly less than a diameter of central channel 236, such that shank portion 190 may be fully or partially received into entrance slot 238. In such an embodiment, body portion 222 must flex radially to temporarily increase inner width Wi to allow shank portion 190 to be pushed through entrance slot 238 into central channel 236.

In an embodiment, body portion 222 may define one or more cavities 240 that extend through body portion 222 between first end 224 and second end 228. The presence of cavities 240 may be particularly useful for relatively thick body portions 222 to facilitate flexing of body portion 222 thereby enlarging the widths of entrance slot 238.

Assembly and fitment of stopper 220 onto adjuster 180 is described further below.

Referring specifically to FIG. 18, another embodiment of headlamp-adjustment stopper 220 is depicted. This embodiment of stopper 220 is substantially similar to the embodiment of FIGS. 15-17. However, in the embodiment of FIG. 19, a thickness of body portion 222 is less than a thickness of body portion 222 of FIGS. 15-17. Further, in the embodiment of FIG. 19, body portion 222 does not define cavities 240.

Figure 19:
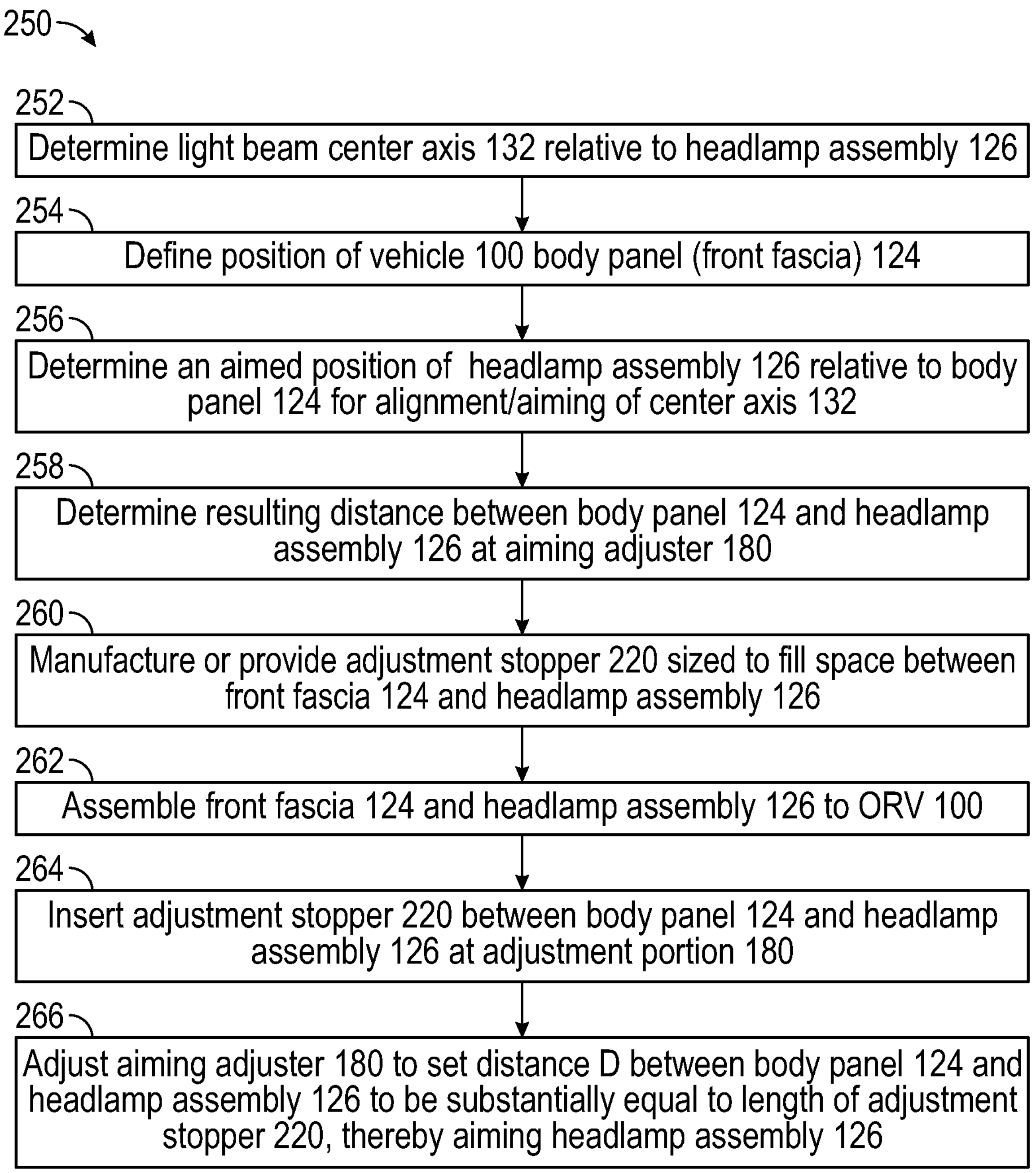
FIG. 19 is a flowchart of a method for adjusting and aiming a headlamp.

Referring to FIG. 19, an embodiment of a method 250 of aiming a headlamp is depicted and described as steps 252 to 266.

Step 252 comprises determining a position of center axis 132 of light 130 relative to headlamp assembly 126. Referring also to FIGS. 7-10, and as described above, each headlamp assembly 126 includes a lamp 166 with emitter 168 emitting a light beam 130 along a light-beam center axis 132. At Step 252 the position of the center axis 132 is determined relative to its corresponding headlamp assembly 126. The position of center axis 132 may be defined relative to one or more portions of headlamp assembly 126 serving as reference points, such as relative to housing 164, one or mounts 170, and/or front side 172, which may be a front lens cover. In an embodiment, a position of center axis 132 may be defined in terms of distances from one or more portions or reference points of headlamp assembly, such as "x" mm away/offset from mount **170*a*2 in an X direction, "y" mm away/offset from mount 170*a*2, "z" mm away/offset from mount 170*a*2. A location or position of emitter 168 through which center axis 132** extends may also defined.

In an embodiment, a position of lamp 166 and/or emitter 168 relative to housing 164 and/or one or more mounts 150 is determined. A center of emitter 168, or a point of highest concentration of light output is determined so as to define center axis 132 of light beam 130 as output from emitter 168. In an embodiment where light output of multiple emitters 168 are combined to form light beam 130, a central point of output may be estimated based on the structural properties and locations of the multiple emitters 168.

At Step 254, a position of a body panel, such as front fascia 124, is determined. In an embodiment, the position of front fascia 124 is determined relative to ground plane 140 (see FIGS. 1-3). In particular, a position of one or more of mounts 150 may be defined relative to ground plane 140 in the 3D coordinate system. For example, a center of mount **150*a*1 is at coordinate (x, y, z) which corresponds to a distance "z" above ground plane 140, a distance "x" from a left-to-right centerline C of ORV 100**, and a distance "y" forward from the origin O along the Y axis or centerline C.

In an embodiment, the position of front fascia 124 and/or positions of its mounts 150 may be determined based on known dimensions of front fascia 124 and known dimensions of connected parts between front fascia 124 and ground plane 140. For example, when assembled to ORV 100, front fascia 124 may be connected to frame 114, which is connected to wheels 120 with tires which are on ground plane 140. The dimensions and orientations of all these components of ORV 100 are known design features, and based on the assumption that ORV 100 is "on" an X-Y plane, or ground plane, the positions of mounts 150 of front fascia 124 are known and defined in the 3D coordinate system.

In an embodiment, the dimensions of the various connected parts, which can be thought of as forming a path from ground plane 140 to the mounts 170, may be assumed to be their nominal dimension without regard to potential variations based on acceptable dimensional tolerances. In another embodiment, a tolerance stack of all parts in the connecting path from ground to mounts may be considered when determining expect mount 170 positions in the coordinate system.

In an embodiment, a computer-aided drafting (CAD) or other computer-processor-aided engineering and drawing system may be used to determine relative positions of front fascia 124 and mounts 170.

At Step 256, an "aimed" position of headlamp assembly 126 relative to front fascia 124 is determined. In the "aimed" position, a location and orientation of headlamp assembly 126 is determined such that center axis 132 of light beam 130 projects or extends as desired, such that light beam 130 also projects as desired, i.e., is "aimed." In an embodiment, an aimed position of headlamp assembly 126 is determined that when headlamp assembly 126 is connected to front fascia 124, the position and orientation would cause center axis 132 to extend in a plane parallel to ground plane 140 (defined as the X-Y plane in the 3D coordinate system embodiment discussed herein), and further, parallel to the Y axis. Such an embodiment is depicted in FIGS. 1-4, wherein center axes 132*a* and 132*b* extend in a plane parallel to ground plane 140, and more particularly, in parallel with the Y axis.

In another embodiment, an aimed position of headlamp assembly 126 is determined such that when headlamp assembly 126 is connected to front fascia 124, the position and orientation would cause center axis 132 to point slightly downward from front fascia 124 in a direction towards the ground plane 140. For example, the aimed position of headlamp assembly 126 may be selected such that an angle between ground plane 140 and center axis 132 is within a range from about 0.5 degree to about 5 degrees, such as from about 1 degree to about 2.5 degrees.

In addition to determining a position of headlamp assembly 126 that causes center axis 132 to be properly aligned, headlamp assembly 126 necessarily needs to be sufficiently close to front fascia 124 such that adjusters 180 can connect mounts 170 of headlamp housing 164 to their respective mounts 150 of front fascia 124. In an embodiment, the aimed position requires that a mount 170 be located at a minimum distance D that is equal to or less than a length of aiming adjuster 180. Alternatively, the minimum distance D must be equal to or less than a maximum allowable distance between two end portions of adjuster 180, such as between body-panel/fascia connector 188 and headlamp-housing connector 186 (see also FIG. 11). More specifically, in one such embodiment, the minimum distance D might be equal to or less than a maximum allowable distance between flanged portion 200 of body-panel/fascia connector 188 and flanged portion 206 of headlamp-housing connector 186. In an embodiment, the maximum allowable distance between flanged portions 200 and 206 may be determined by structural features and dimensions of various components of adjuster 180, such as a length of adjusting rod 184, length of threaded portion of shank 190, lengths of connectors 186, 188, and so on.

Another factor that may be considered in determining the aimed position of headlamp assembly 126 relative to front fascia 124 is the alignment of headlamp assembly 126 with a corresponding opening 154 in front fascia 124. Such a position may also include locating and orienting headlamp assembly 126 such that a distance between a front side or lens cover of headlamp assembly 126 and opening 154 is minimized, or, such that a front side 172 of headlamp assembly 126 actually protrudes through opening 154 in fascia 154. Depending on the radiation pattern of beam 130, locating headlamp assembly close to fascia 124, and orienting to align with opening 154, may prevent any portions of light beam 130 from reflecting off of rear side 144 of front fascia 124.

In an embodiment, a computer-aided drafting (CAD) or other computer-processor-aided engineering and/or drawing system may be used to determine the position and orientation of headlamp assembly 126 with respect to front fascia 124. In one such embodiment, designs, including one or more dimensions, of headlamp assembly 126, front fascia 124 (or other body panel of ORV 100), and additional parts connected to front fascia 124, which may include other body panels, frame 114, parts of suspension 118, wheels 120, and other components of ORV 100, are saved into a memory device of a computer with a processor of the CAD system. In a next step, ground plane 140 is defined in a 3D coordinate system. Graphical representations of the various components are positioned relative to one another in the 3D coordinate system to simulate and, in some embodiments, display, the components being in assembled position relative to one another, such that a position of front fascia 124 and its mounts 150 are determined by the CAD system. Next, a graphical representation of headlight assembly 126 with center axis 132 is moved by a user of the CAD system into a position relative to a graphical representation of front fascia 124 that causes center axis 132 to be aligned in a desired aiming direction. The position of headlamp assembly 126 and its mounts 170 relative to front fascia 124 and its corresponding mounts 150 is thereby determined by the CAD system and communicated to the CAD user and/or stored in the CAD system or computer memory.

Alternatively, ORV 100 may be fully or partially assembled with actual physical components to determine an aimed position of headlamp 126 relative to front fascia 124.

At Step 258, after determining the aimed position of headlamp assembly 126, the distance from each mount 170 of headlamp assembly 126 to a corresponding mount 150 of front fascia 124 is determined. Determining the distance from a mount 170 to a corresponding mount 150 may include determining a distance between connectors 186 and 188 as described above using a CAD system. The distance may be determined by fully or partially assembling ORV 100 to connect headlamp 126 to front fascia 124 via adjuster 180, or may be determined using a CAD system as part of, or as a step subsequent to, Step 256. A distance D for each pair of corresponding mounts may be different, e.g., distance D between mount 150*a*1 and 170*a*1 may be greater than or less than distance D between mount 150*b*1 and 170*b*1.

Once the distance between mounts 150 and 170 are determined at Step 258, at Step 260, dimensions of adjustment stopper 220, and particularly a length L, can be determined, and the stopper manufactured or otherwise provided. As briefly described above with respect to FIGS. 15-18, and as described further below, adjustment stopper 220 is configured to fit in space S between fascia 124 and headlamp assembly 126 at or on aiming adjuster 180 to prevent or "stop" headlamp assembly 126 from moving towards fascia 124 further than desired. The length of adjustment stopper 220 may for each connection point, as the distance D may be different for different pairs of mounts 150/170, as described above with respect to Step 258.

At Step 262, during the manufacture and assembly of ORV 100, headlamp assembly 126 is initially connected to front fascia 125 via aiming adjusters 180. Refer also to FIG. 14 which depicts a connection between headlamp assembly 126 and front fascia 124, and in particular, between mount 150*a*2 of front fascia 124 and mount 170*a*2 of headlamp assembly 126 via aiming adjuster 180. In an embodiment, aiming adjuster 180 with connectors 186 and 188 are preassembled to headlamp assembly 126. In one such embodiment, a distance D between connector 186 and 188 is maximized, i.e., distance D is maximized; in another embodiment, distance D is simply greater than zero. Body-panel connector 188 may then be pushed into hole 160 in mount 150, thereby connecting the headlamp assembly to the fascia. In the embodiment depicted, each headlamp assembly 126 has three connection points, utilizing three aiming adjusters 180. After installation, a space S is formed between front fascia 124 and mounting portions of headlamp assembly 126.

At Step 264, adjustment stopper 220 is inserted in the space S between mount 150 of front fascia 124 and mount 170 of headlamp assembly 126, at or on aiming adjuster 180.

FIG. 14 depicts a connection between headlamp assembly 126 and fascia 124 via an adjuster 180 between mounts 150*a*2 and 170*a*2 prior to insertion of adjustment stopper 220. As depicted, a space S is formed between the mounts with a separation distance D.

Figure 20:
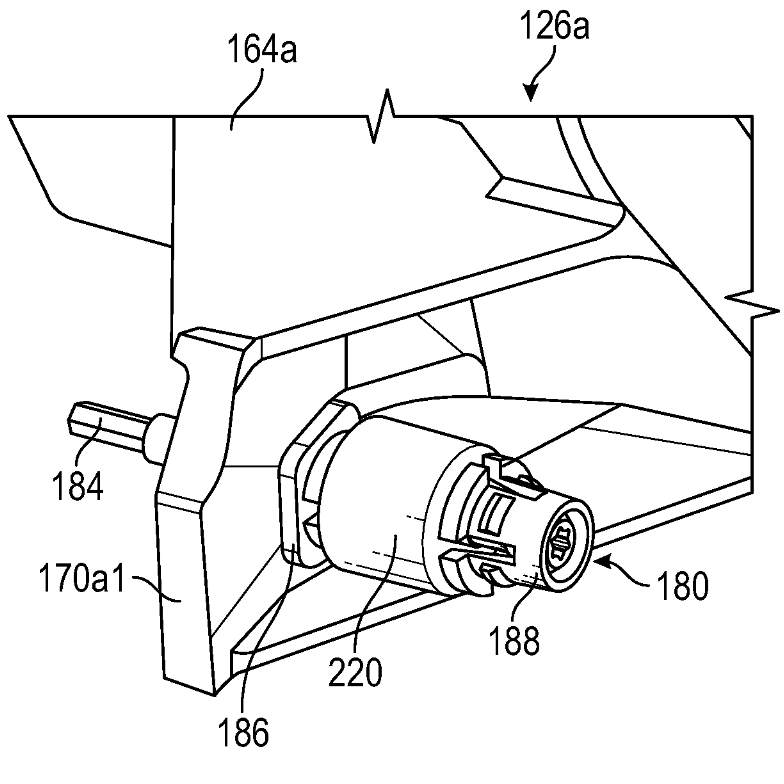
FIG. 20 is a perspective view of an aiming adjuster with an attached adjustment stopper, connected to a mounting portion of a headlamp assembly.

Referring also to FIG. 20, an embodiment of aiming adjuster 180 with mounted adjustment stopper 220, connected to lamp assembly 126 at housing 164 is depicted. Referring also to FIGS. 11 and 15-16 shank portion 190 of adjusting rod 184 is received into central channel 236 via entrance slot 238. During assembly, shank portion 190 is aligned with entrance slot 238 and pressed against body portion 222, a radial force is applied to body portion 222 at a side opposite to entrance slot 238 causing body portion 222 to flex and increase the width of entrance slot 238, followed by adjustment stopper 222 fitting onto shank portion 190 such that part of shank portion 190 is received in central channel 236. As such, adjustment stopper 220 is positioned between connectors 186 and 188 on adjusting rod 184 of aiming adjuster 180.

In the embodiment depicted in FIG. 20, adjustment stopper 220 substantially fills the space S (see also FIGS. 11 and 14) between connector 186, attached to headlamp assembly 126*a* and connector 188 attached to front fascia 124. However, in an embodiment, and as described further below with respect to Step 266, adjustment stopper 220 may be set or adjusted such that a distance D is initially greater than a length L of adjustment stopper 220 for case of placement of adjustment stopper 220 onto aiming adjuster 180, followed by further adjustment to reduce distance D to be substantially equal to length L, thereby clamping adjustment stopper 220 between fascia a124 and headlamp assembly 126, and between connectors 186 and 188.

Figure 21:
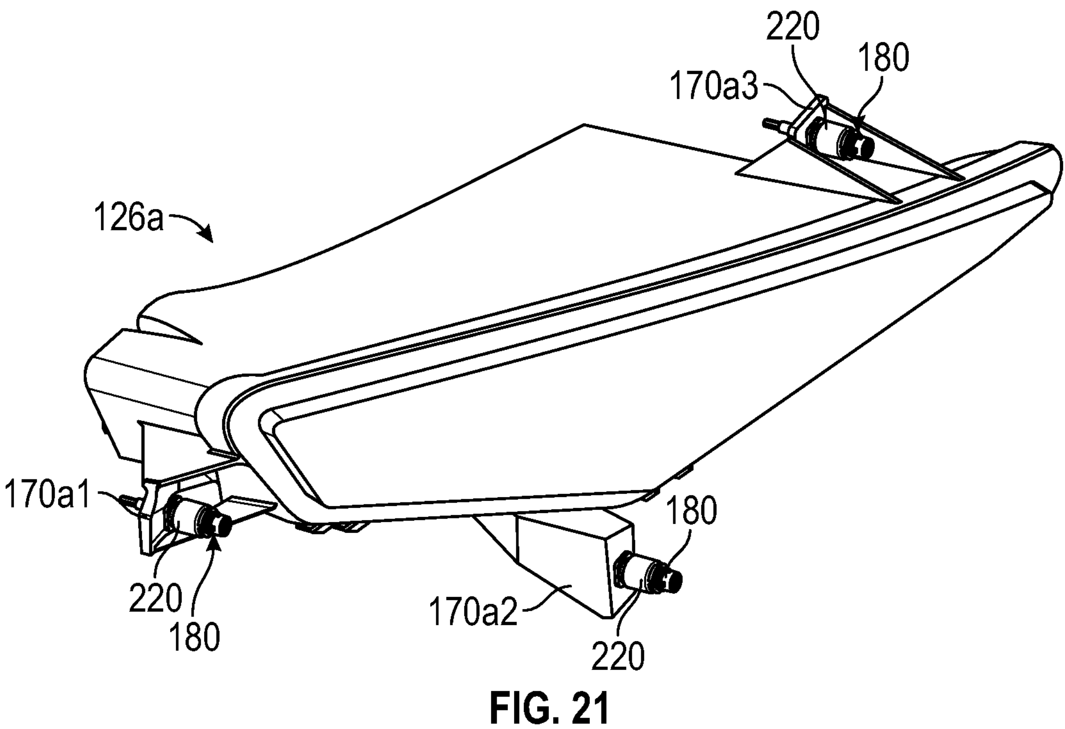
FIG. 21 is a perspective view of three aiming adjusters with attached adjustment stoppers, connected to three mounting portions of a headlamp assembly.
Figure 22:
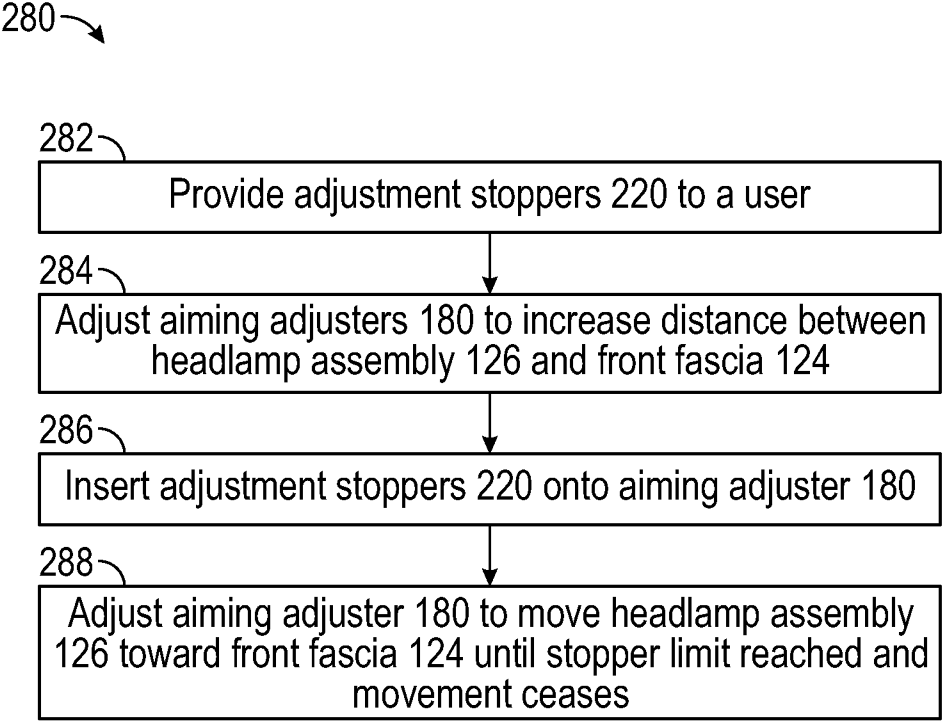
FIG. 22 is a flowchart of a method for adjusting and aiming a headlamp of an assembled ORV.

Referring also to FIG. 21, three aiming adjusters 180 with adjustment stoppers 220 are attached to their respective mounts 170*a*1, 170*a*2 and 170*a*3 of headlamp assembly 126*a*. Similarly, aiming adjusters 180 with adjustment stoppers 220 are attached to mounts 170*b*1, 170*b*2 and 170*b*3 of headlamp assembly 126*b*.

Referring again to FIG. 19, and at Step 266, after installation of adjustment stopper onto adjusting rod 184 of aiming adjuster 180, aiming adjuster 180 is adjusted. In an embodiment, adjustment rod 184 is rotated to cause headlamp assembly 126 to move closer to front fascia 124. Rotation in a direction bringing headlamp assembly 126 with mount 170 closer to front fascia 124 and mount 150, and resulting movement of headlamp assembly 126, will be limited due to adjustment stopper 220. When a distance D between mount 170 of headlamp assembly 126 and corresponding mount 150 of front fascia 124 is greater than length L of adjustment stopper 220, rotation of adjusting rod 184 and subsequent movement of headlamp assembly 126 is possible. In other words, adjustment stopper doesn't fill the entire space, and there is room to adjust. However, as distance D approaches and is reduced to equal length L, second end 228 of adjustment stopper 220 will abut fascia connector 188 at its flange portion 206 and/or will abut front fascia 124, and first end 224 of adjustment stopper 220 will abut connector 186 of headlamp assembly at its flange portion 200 and/or headlamp assembly 126, stopping or limiting relative movement. In other words, adjustment stopper 220 becomes wedged between headlamp assembly 126 and front fascia 124, preventing further rotation of adjusting rod 184 and preventing further motion of headlamp assembly 126 toward front fascia 126.

After placing adjustment stoppers 220 at each headlamp adjusting connection, each aiming adjusters 180 is adjusted as described above to move headlamp assembly 126 at each adjuster 180 to be as close as stopper 220 will allow. Following this adjustment, headlamp 126 achieves the desired predetermined aimed position such that headlamp assembly 126 is "aimed" and center axis 132 of light beam 130 is aligned as determined (which may be parallel to the Y axis above ground plane 140, as described above).

Although a particular sequence of Steps 252 to 266 are described, it will be understood that the order of performing these steps may be changed, or certain steps combined.

In an embodiment, Step 264, inserting adjustment stopper 220, may be performed prior to assembling headlamp assembly 126 to ORV 100 in Step 262. Further Step 266 may be performed prior to Step 262, also. In other words, adjustment stopper 220 may be placed onto aiming adjuster 180 on headlamp assembly 126 and then adjusted prior to headlamp assembly 126 being connected to front fascia 124 and being assembled onto ORV 100.

The method 250 of adjusting a headlamp of an ORV 100 avoids the costly, time-consuming and often inaccurate method of manual headlamp aiming most typically used by manufacturers, dealers and consumers. The advantages of the methods and steps described above may be captured by a manufacturer as part of the manufacturing process, but may also be realized by an individual seeking to aim headlamps after manufacture of an ORV 100.

In another embodiment, method 280 is directed to aiming a headlamp of an already-assembled ORV 100.

At step 282, ORV 100 and a set of adjustment stoppers 220 are provided to, and received by, a user, which may be a factory worker, technician, consumer, or other individual.

At step 284, the user adjusts aiming adjusters 180 of headlamp assemblies 126 to increase a distance between headlamp assembly 126 and front fascia 124, the distance being great enough to allow an adjustment stopper 220 to be inserted onto the aiming adjuster 180. This step may be eliminated if the distance is already great enough for the adjustment stopper 220 to be inserted onto aiming adjuster 180.

At Step 286, the user inserts each adjustment stopper 220 onto an aiming adjuster 180. In an embodiment, each adjustment stopper 220 is fit onto a rotatable adjusting rod 184 of adjuster 180, as described above.

At Step 288, the user adjusts each aiming adjuster 180 causing headlamp assembly 126 to move toward front fascia 124, until adjustment stopper 220 limits, prevents or otherwise stops adjustment of adjuster 180 and movement of headlamp assembly 126, thereby achieving aiming of headlamp assemblies 126 and their respective headlamps and beams.

Using this method, a technician, dealer, consumer or any user may quickly and easily adjust headlamps of an ORV 100.

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed. The above references in all sections of this application are herein incorporated by references in their entireties for all purposes.

While the aforementioned particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of adjusting a headlamp assembly of an off-road vehicle (ORV), the headlamp assembly connectable to a component of the ORV, and including a headlamp for emitting a light beam defining a center axis and a mounting portion, comprising:

determining a light beam center axis position relative to the headlamp assembly;

defining a position of the component of the ORV;

determining an aimed position of the headlamp assembly relative to the position of the component of the ORV;

pre-calculating, based on the determined light beam center axis position, the position of the component of the ORV, and the aimed position of the headlamp assembly, a distance between the mounting portion of the headlamp assembly and a mounting portion of the component of the ORV;

providing an adjustment stopper having a length substantially equal to the distance between the mounting portion of the headlamp assembly and the mounting portion of the component of the ORV; and inserting the adjustment stopper in a space between the mounting portion of the headlamp and the mounting portion of the component of the ORV.

2. The method of claim 1, further comprising connecting the headlamp assembly to the component of the ORV with an aiming adjuster, and wherein inserting the adjustment stopper in a space between the mounting portion of the headlamp and the mounting portion of the component of the ORV includes attaching the adjustment stopper to the aiming adjuster.

3. The method of claim 2, wherein attaching the adjustment stopper to the aiming adjuster comprises bending the adjustment stopper and receiving a portion of the aiming adjuster into a channel of the adjustment stopper.

4. The method of claim 2, further comprising adjusting the aiming adjuster causing the headlamp assembly to move toward the component of the ORV until the adjustment stopper prevents movement of the headlamp assembly.

5. The method of claim 1, wherein determining a position of the component of the ORV includes determining a position of the mounting portion of a body panel of the ORV relative to a defined ground plane.

6. The method of claim 1, wherein determining an aimed position of the headlamp assembly relative to the position of the component of the ORV includes:

defining a ground plane in a 3D Cartesian coordinate system having orthogonal X, Y and Z axes, the ground plane including the X and Y axes;

determining a first position of the headlamp assembly that causes the light beam center axis to extend in a first plane;

determining a second position of the headlamp assembly that aligns the light beam center axis to be parallel with the Y axis while maintaining the light beam center axis in the first plane;

determining a third position of the headlamp assembly that maintains the light beam center axis in the first plane and parallel to the Y axis, and that causes the mounting portion of the headlamp assembly to be within a predetermined distance from the mounting portion of the component of the ORV;

wherein the third position of the headlamp assembly is the aimed position of the headlamp assembly.

7. The method of claim 1, wherein determining a light beam center axis position of the light beam relative to the headlamp assembly includes determining at least one point on the headlamp assembly where the light beam center axis intersects.

8. A method of adjusting a position of a headlamp assembly to aim a headlamp of an off-road vehicle (ORV), comprising:

receiving a first adjustment stopper configured to attach to a first aiming adjuster of the ORV, the first adjustment stopper having a fixed length;

attaching the first adjustment stopper to the first aiming adjuster of the ORV in a first space between a front portion of the ORV and a first portion of the headlamp assembly;

adjusting the first aiming adjuster to decrease a first distance between the headlamp assembly and the front portion of the ORV; and ceasing adjustment of the first aiming adjuster when the front portion of the ORV and the first portion of the headlamp assembly are both in contact with the first adjustment stopper.

9. The method of claim 8, further comprising adjusting the aiming adjuster to increase a distance between the headlamp and a front portion of the ORV prior to attaching the adjustment stopper to the aiming adjuster.

10. The method of claim 8, wherein ceasing adjustment of the aiming adjuster when the front portion of the ORV and the portion of the headlamp assembly are both in contact with the first adjustment stopper includes ceasing adjustment of the aiming adjuster when a connector attached to the front portion of the ORV and another connector attached the portion of the headlamp assembly are both in contact with the first adjustment stopper.

11. The method of claim 8, wherein a length of the first adjustment stopper is substantially equal to a distance from the front portion of the ORV to the first portion of the headlamp assembly after adjustment of the first aiming adjuster has ceased.

12. The method of claim 8, wherein adjusting the first aiming adjuster to decrease a first distance between the headlamp and the front portion of the ORV includes rotating an adjusting rod of the first aiming adjuster.

13. The method of claim 12, wherein attaching the first adjustment stopper to the first aiming adjuster of the ORV in a first space between the front portion of the ORV and a first portion of the headlamp assembly includes bending the adjustment stopper and receiving a portion of the adjusting rod of the aiming adjuster into a channel of the adjustment stopper.

14. A headlamp adjustment and aiming system for an off-road vehicle (ORV), comprising:

a headlamp assembly including a headlamp housing, a headlamp configured to output a light beam, and a mounting portion;

a rotatable aiming adjuster including a first end connectable to the mounting portion of the headlamp assembly and a second end connectable to a portion of the ORV, the aiming adjuster configured to move the mounting portion in a first direction of the first end toward the second end when rotated; and an adjustment stopper configured to attach to a portion of the rotatable aiming adjuster between the adjuster first and second ends and to limit the movement of the mounting portion in the first direction, wherein the adjustment stopper forms a collar configured to receive a portion of the rotatable aiming adjuster.

15. The headlamp adjustment and aiming system of claim 14, wherein the portion of the ORV connectable to the second end of the rotatable aiming adjuster comprises a portion of a front fascia of the ORV.

16. The headlamp adjustment and aiming system of claim 14, wherein the mounting portion of the headlamp assembly comprises a boss defining an aperture.

17. The headlamp adjustment and aiming system of claim 16, further comprising a headlamp connector connected to the boss and inserted into the aperture.

18. The headlamp adjustment and aiming system of claim 14, wherein the adjustment stopper forms a collar configured to receive a portion of the rotatable aiming adjuster.

19. The headlamp adjustment and aiming system of claim 14, wherein the adjustment stopper includes a generally cylindrical body portion defining an entrance slot and a central channel.

20. The headlamp adjustment and aiming system of claim 19, wherein the rotatable aiming adjuster includes a threaded rod having the first end and the second end.

* * * * *